US006734581B1

(12) United States Patent
Griffis

(10) Patent No.: US 6,734,581 B1
(45) Date of Patent: May 11, 2004

(54) PROGRAMMABLE EMERGENCY-STOP CIRCUIT WITH TESTING

(75) Inventor: Michael Griffis, High Springs, FL (US)

(73) Assignee: Eigenpoint Company, High Springs, FL (US)

( * ) Notice: Subject to any disclaimer, the term of this patent is extended or adjusted under 35 U.S.C. 154(b) by 214 days.

(21) Appl. No.: 10/107,999

(22) Filed: Mar. 27, 2002

Related U.S. Application Data

(63) Continuation-in-part of application No. 09/428,981, filed on Oct. 28, 2000, now Pat. No. 6,392,318.
(60) Provisional application No. 60/141,853, filed on Jul. 1, 1999, and provisional application No. 60/106,051, filed on Oct. 28, 1998.

(51) Int. Cl.[7] .............................................. H01H 47/00
(52) U.S. Cl. ..................... 307/125; 307/326; 192/129 R
(58) Field of Search ................................. 307/125, 130, 307/131, 326; 361/191–193; 192/129 R, 131 R, 131 H, 132–135, 129 A

(56) References Cited

U.S. PATENT DOCUMENTS

| 4,263,647 A | 4/1981 | Merrell et al. |
| 4,349,747 A | 9/1982 | Hasegawa |
| 4,481,449 A | 11/1984 | Rodal |
| 4,839,533 A | 6/1989 | Aga |
| 4,912,384 A | 3/1990 | Kinoshita et al. |
| 5,278,454 A | 1/1994 | Strauss et al. |
| 5,319,250 A | 6/1994 | Windsor |
| 5,319,306 A | 6/1994 | Schuyler |
| 5,394,017 A | 2/1995 | Catano et al. |
| 5,436,788 A | 7/1995 | Wallaert |
| 5,532,675 A * | 7/1996 | White ......................... 340/515 |
| 5,629,864 A | 5/1997 | Noe et al. |
| 5,687,052 A | 11/1997 | Bennett |
| 5,696,679 A | 12/1997 | Marshall et al. |

* cited by examiner

Primary Examiner—Gregory J. Toatley, Jr.
Assistant Examiner—Sharon A. Polk
(74) Attorney, Agent, or Firm—Christine O. McLeod; Beusse Brownlee Wolter Mora & Maire

(57) ABSTRACT

The invention includes a programmable emergency-stop circuit apparatus and method that provides advanced function not found in other systems. The circuit centralizes the control of high voltage motor power into one place, by providing connections for, in its minimum configuration, several different kill switches, a motors-on button, and an AC motor power relay coil. In the present invention, kill switches, test inputs, emergency-stop and motors-on buttons, computer ready and watchdog signals are all conveniently connected in one location, alongside the AC motor power relay coil driver. Programmable options exist for testing kill inputs online, while the emergency stop is energized.

22 Claims, 12 Drawing Sheets

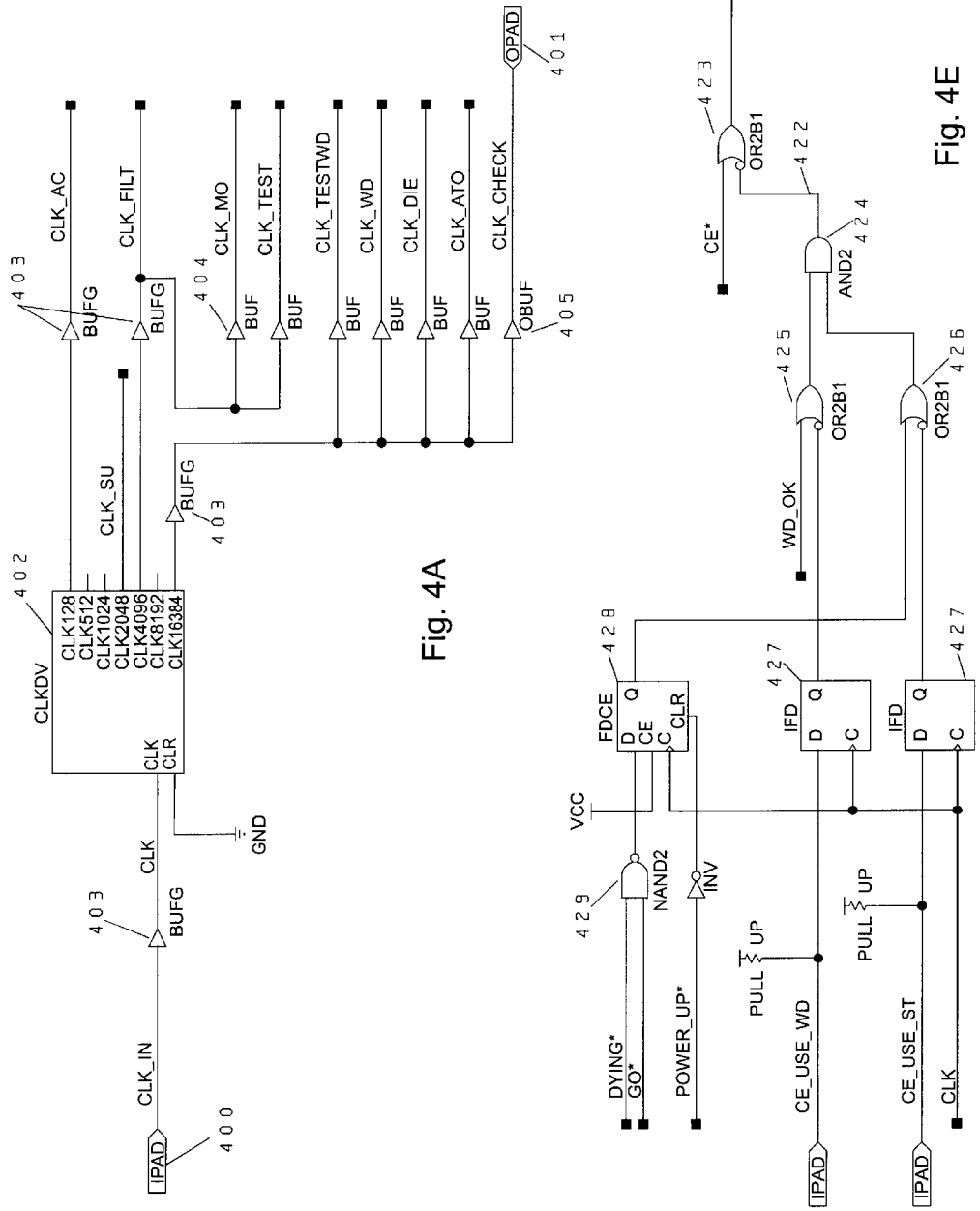

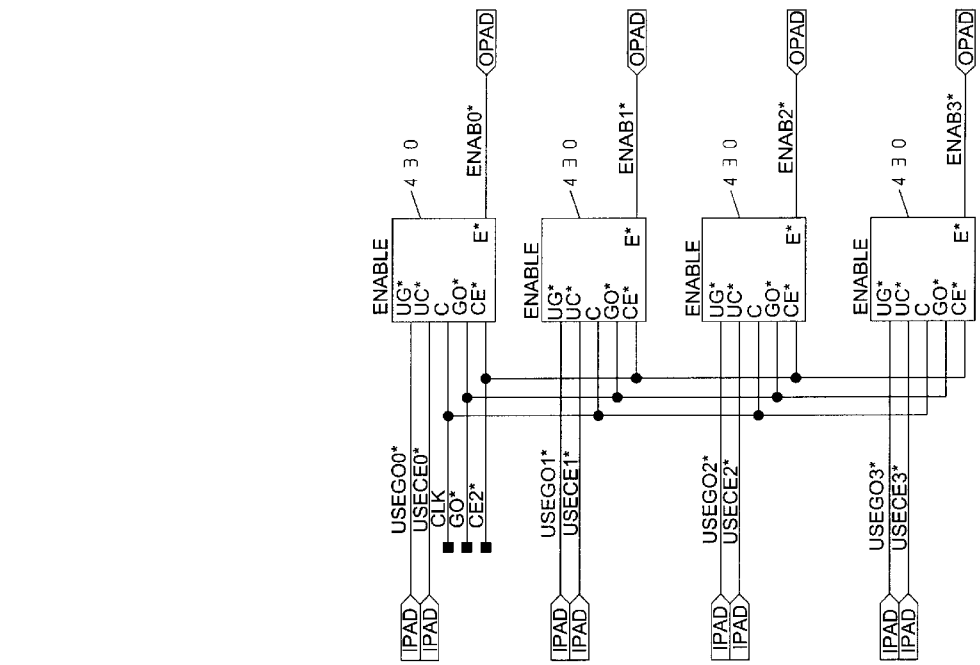
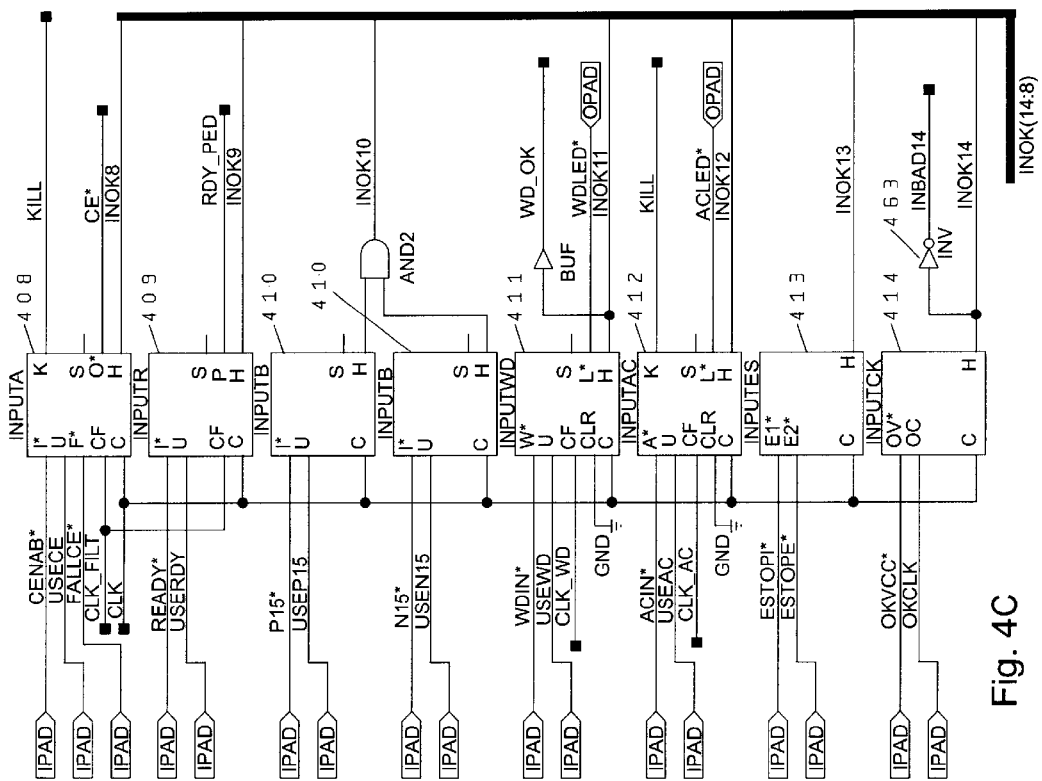

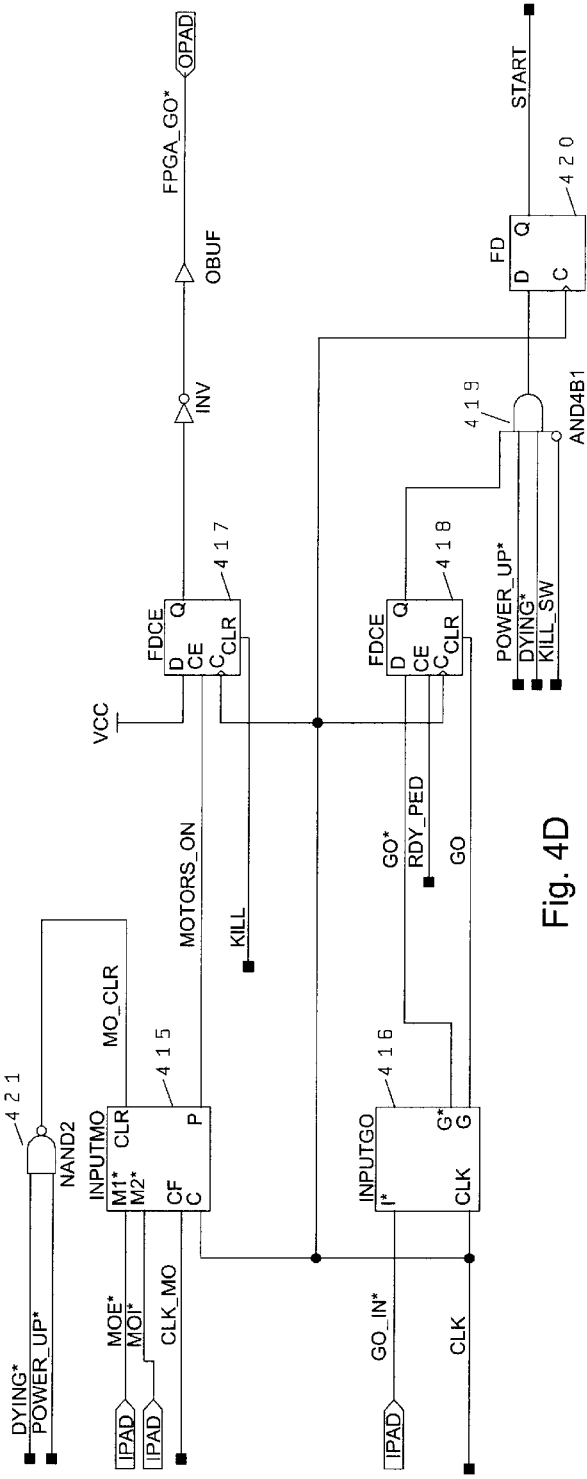
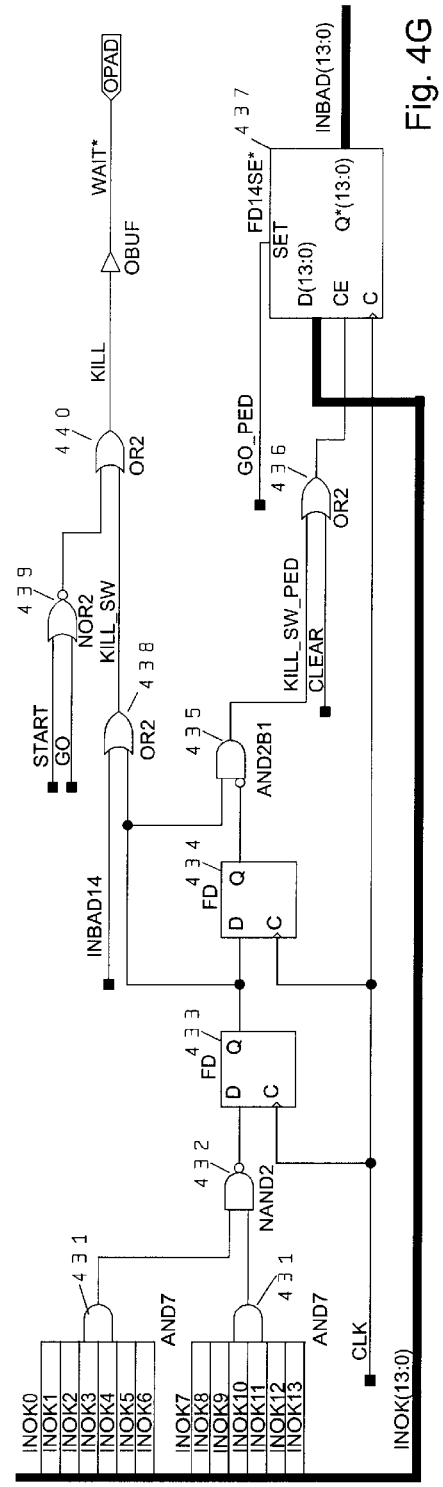
Fig. 4D
Fig. 4G

PROGRAMMABLE EMERGENCY-STOP CIRCUIT WITH TESTING

CROSS-REFERENCE TO RELATED APPLICATIONS

This application is a continuation-in-part,of U.S. patent application Ser. No. 09/428,981, filed Oct. 28, 1999, now U.S. Pat. No. 6,392,318, which claims priority from U.S. provisional application Serial No. 60/141,853, filed Jul. 1, 1999, and U.S. provisional application Serial No. 60/106,051, filed Oct. 28, 1998.

FIELD OF INVENTION

The present invention relates to an emergency-stop circuit, which is an integral part of the typical industrial machine. More particularly, this invention relates to a centralized switching system and method for an emergency stop circuit.

BACKGROUND INFORMATION

In industrial equipment, the traditional emergency-stop circuit consists of a "self-latching" relay that contains a number of closed (kill) switches which are connected in series, and when any one of the switches is opened, the relay is de-energized. Power is restored when all kill switches are closed, and a "motors-on" momentary switch (e.g., pushbutton switch) manually closes the contacts of the relay. The relay contacts are the last link in the serial chain of switches that energizes the coil of the relay. It is self-latching in the sense that when the motors-on switch is released, the contacts are in the coil energizing circuit that keep them closed in the first place. The coil energizing circuit is referred to herein as the emergency-stop circuit.

A robust, traditional circuit may have many kill switches in the emergency-stop circuit. These switches are typically distributed all over the machine. For example, lever-type switches are installed on door panels, so that power is killed (i.e., shut off) when one of the doors opens. This is referred to as the normally open configuration (NO), which means that the switch must be tripped to conduct. This kind of kill switch is the first to be defeated in practice. It is often taped or strapped closed so that a door may remain open during operation of the machine. (A common purpose for the defeat is debugging by a maintenance technician.) When there are several doors defeated in this manner located throughout a large machine, the probability is higher than desirable for a maintenance technician to inadvertently leave a switch defeated and return the machine to what will be unsafe use. Also, the cycle of taping/strapping and removal thereof causes wear and tear on the lever-type switch for which it was not designed.

Other types of kill switches used in the industry include over-travel switches. These switches normally operate in the closed configuration (NC), which means that tripping of the switch opens the circuit. These switches include lever-type, magnetic, infrared, or the like. To defeat over-travel switches, the switches are temporarily removed, terminals jumpered, mounting screws loosened, and brackets are slid out of the way. This also creates opportunity for mistakenly leaving kill switches defeated (or misaligned) throughout the machine when it is returned to service.

Another example of a kill switch is an air pressure switch sensing an air line that delivers required air to an air bearing spindle. In a demonstrating test, or debug mode, the machine may be run without the spindle running (no air supplied or air temporarily unavailable). This requires the jumpering of the kill switch during such time. Afterwards, forgetting to re-enable the switch allows running of the spindle without air, which leads to hardware damage.

Evidently, safe use of the traditional emergency-stop circuit requires experience and diligence on the part of the maintenance technician who attempts to temporarily bypass sections of the circuit in order to test or debug the system. Oversight due to distribution of the switches over numerous parts of the machine/device can cause him to forget to re-enable a kill switch before returning equipment back to duty.

Additionally, in order to test and debug, the technician must also disable certain devices whose power is controlled by the emergency-stop circuit. There is no straightforward, universal way to do this other than disconnecting the power to the device. This may be easy in some cases or not possible, very cumbersome, or unsafe in others.

A final consideration for these testing and debugging methods is the time required for a technician to trace through a machine in order to determine where to disable a kill switch or where to disconnect power to a device. Additionally, managerial time may be spent generating documentation in order to aid the technician's task. This becomes apparent when one considers a factory floor that possesses a vast array of one-of-a-kind machines, all of which utilize some variant of the traditional emergency-stop circuit. Here, hypothetically, each circuit possesses essentially the same topology but utilizes different components that are located in different places and connected by a slightly different wiring scheme.

In spite of this, implementation of traditional emergency-stop circuits that are intrinsically "safe" is certainly feasible and has been done for many years. There are reasons for the apparent success. It is a simple circuit, even though it is distributed throughout the machine. It well established. There are few components. But these are also the reasons why the circuit has not matured.

Typically, experienced engineers are reluctant to add new parts and kill switches to the circuit in an effort to "keep it simple." In developing prototypes or one-of-a-kind machines, important kill switches such as a watchdog circuit and a computer ready are often omitted. Also, some kill switches having solid state outputs (e.g. NPN) do not fit into the serially connected topology. Each requires an extra part, such as an intermediate electro-mechanical relay, whose contacts are in the kill switch chain, and whose coil is controlled by the solid state output. Because of this, sensors employing solid state outputs are avoided, and their less reliable mechanical counterparts are used instead.

Essentially, there is a mindset among skilled engineers concerning the altering of the traditional circuit's topology. Typically, the skilled engineer begins a new project assuming that he will use the traditional circuit. Valuable time is spent on other areas and is not devoted to re-engineering the architecture for the traditional circuit or evaluating its expanded role in the project. In fact, it is not obvious to the skilled engineer to change the traditional circuit in any way in order to add functionality that can be safely incorporated within it. Such functionality, if implemented, is therefore left to be distributed throughout the remainder of the system, intermingled with unsafe subsystems such as the computer.

When implemented, for example, secondary outputs, such as amplifier "enable" or "inhibit" signals, are not usually incorporated into an emergency-stop circuit. If driven at all, a software program running on a computer having optically isolated digital outputs usually drives them. Furthermore, other feedback signals, such as "status" or "fault" signals, are not used in emergency-stop circuits as kill inputs. This is generally because each signal is in a non-conducting state when the circuit is killed, which prevents the traditional circuit from restarting. If used at all, these feedback signals are likewise connected to the computer for the purposes of monitoring.

Designing in this way fosters subtle system-wide shortcomings, which can permit potentially unsafe or undesirable operation. Resulting failures or odd performance is not attributed to the emergency-stop circuit, since its simple circuitry and lack of substantial functionality are not directly responsible. Consequently, effort is typically not expended to evaluate its functionality.

One of the shortcomings becomes apparent when the traditional system enters into a power-loss period, which generally begins when the emergency-stop circuit is killed and ends when all residual power has been dissipated. During this brief period (e.g., 2 sec.), uncontrolled motion of motors can occur for some designs, because the motors are not being controlled, yet they are still technically powered by residual power in the system. In order to suppress this, designers have used the computer-controlled secondary outputs (enable, inhibit) in conjunction with the emergency-stop circuit to simultaneously cut power and disable the connected devices. This works in most cases, but is tedious to design, not flexible, and application specific. One case when this design fails is when the building power fails, which causes the computer to also cease functioning. Here the inhibit signal may not get to the device, which again creates an environment for briefly uncontrolled motion.

Most of the examples found in existing technology are concerned with passive monitoring of the emergency-stop circuit. This approach is useful in determining which kill input was responsible for stopping the circuit, but it does not provide any configuration options for startup or power-loss periods. The following patents, each of which is incorporated herein by reference, demonstrate this approach: U.S. Pat. No. 4,263,647 to Merrell, et al., entitled "Fault Monitor for Numerical Control System"; U.S. Pat. No. 5,451,879 to Moore, entitled "Electromechanical Relay Monitoring System with Status Clocking"; U.S. Pat. No. 4,616,216 to Meirow, et al., entitled "Emergency Stop Monitor"; and U.S. Pat. No. 5,263,570 to Stonemark, entitled "Conveyor Belt Emergency Stop Indicator Light System." Configuration options do exist in the above noted patents but only in the form of providing cascaded inputs and outputs so that multiple groups of sensors may be monitored. Other patents of interest include the following: U.S. Pat. No. 4,912,384 to Kinoshita, et al., entitled "Emergency Stop Control Circuit" discloses the traditional active portion of the emergency-stop circuit; U.S. Pat. No. 5,319,306 to Schuyler entitled "Portable Electrical Line Tester Using Audible Tones to Indicate Voltage" discloses circuits that provide audio status in the form of line testers, where the leads are brought into contact after the line is energized to check it.

Traditional approaches to supplying power to motors during a power-loss period (period beginning with the loss of AC motor power and ending with either the total loss of all stored DC motor power or the loss of regulation of any associated logic power supply, whichever comes first) have focused on coarse (non-servo) control or decelerating motors to full stop. However, no approach exists that relates to fields employing emergency-stop circuitry.

Other patents in this general field are also noted. For example, U.S. Pat. No. 5,278,454 to Strauss, et al. discloses an invention related to the heating, ventilation, and air conditioning field. It describes a motion control system that senses a loss of incoming power and utilizes a dedicated pre-charged circuit to act as a short duration power supply to effect gross motion of a motor to close a damper. U.S. Pat. No. 5,426,355 to Zweighaft, et al., entitled "Power-Off Motor Deceleration Control System" discloses an invention related to the tape drive industry in which a motion control system whose amplifier stores a dedicated internal PWM signal responsible for supplying open-loop deceleration commands for a given configuration of the tape drive system that is experiencing a power-loss period. U.S. Pat. No. 4,481,449 to Roda entitled "Power Fail Servo System" discloses an invention that also relates to the tape drive field which describes the use of several "power fail" signals that work in harmony to decelerate the motor towards full stop and uses the technique of dynamic braking to harness excess power in the storage capacitor. A signal exists in this example which monitors the logic power supply and appropriately disables (free wheels) the motor once the supply is out of regulation.

Recently, new requirements for emergency-stop circuits have emerged. For some applications, circuits are required either to be "control reliable" or to at least possess self-monitoring functions (ANSI/RIA R15.06-1999). To ensure safety, a certain sensor for a given application may require periodic testing online. The only way to do this is to test the entire sensor channel, from the sensor all the way back to its connection in the emergency stop circuit. The test should include controlled, deliberate tripping of the sensor (e.g. a flap mechanically covers an infrared intrusion sensor) so that a valid test is characterized by cycling of the corresponding kill input back at the emergency-stop circuit. The challenge is to do this but still keep the emergency-stop circuit energized, so that useful work can continue. The emergency-stop circuit has to be smart enough to temporarily ignore the kill input while it is being tested.

BRIEF SUMMARY OF THE INVENTION

The present invention solves the problems in the art by providing a centralized programmable emergency-stop circuit that controls the flow of the power necessary for a machine to move its working elements. The invention possesses various levels of programmability that facilitate use of the same circuit across a wide variety of industrial applications and designs, as well as across a wide variety of operational scenarios for the same machine.

The circuit of the present invention includes various types of custom programmable kill inputs. These inputs are signals that, subject to their programming, can kill an energized emergency-stop circuit or prevent a killed circuit from energizing (startup). A given kill input can also be programmed to be ignored totally, to kill when inactive, or to also prevent startup when inactive. A given kill input can be programmed so that it only affects the energized circuit and does not restrict startup, and consequently, it may be inactive at startup. Such a programmed kill input is referred to herein as a "falling-type," because once it does go active, it is the active-to-inactive or falling transition that kills the circuit. Additional programming for the kill inputs exists such as digital filter parameters, clock selection, and the like, as well as time-out options for the falling-type kill inputs, which require them to go active within some period after startup.

The present invention also provides programming options to specify conditions for a motors-on signal to energize the circuit and for the control of secondary outputs. While the primary output of the circuit controls the flow of bulk power to working elements, it is the secondary outputs that connect in parallel to the working elements in order to inhibit or enable them. The method of programming secondary outputs determines their behavior, i.e., whether they are disabled entirely for the session, enabled only when the circuit is energized, or enabled based on one of the kill input signals. This latter setting permits a computer to keep a device enabled during a power-loss period, so that a reactionary movement can be effected which drains residual power left in the dying system.

The present invention provides further programmability and functionality by incorporating an option to designate a chosen input signal as a "test input". A computer uses a "test input" to notify the emergency-stop circuit that it is "testing" a second input currently being used as a kill input. Proper operation will see the associated kill input cycle (active-to-inactive-to-active) within a programmable interval that begins when the test input activates. During this period, the emergency-stop circuit does not use the associated kill input in the kill or startup equations (temporarily ignores it). After the interval expires or after the kill input correctly cycles, the emergency-stop circuit returns to using the kill input in these equations.

A fault occurs in the case when the kill input fails to cycle within the prescribed interval, which signifies the sensor channel being tested is stuck active or faulty. In this case, specifically, the emergency-stop circuit kills power if the circuit is energized and prevents startup if the kill input being tested is not a falling-type. The type of kill input being tested affects the behavior of the emergency-stop circuit in a straightforward way. For example, a kill input that is a falling-type is not used in startup equations. Therefore, its testing has no effect when the circuit is not yet energized. In general, testing only has an effect in the case whenever the emergency-stop circuit actually requires the associated kill input to be active, or as it is said here, when the circuit is "sensitive" to the actual state of the kill input.

Optionally, the test input itself can be used as a watchdog-type kill input, which requires the test input itself to become active every so often thereby requiring testing of the associated kill input at a programmable frequency. Then, in this most encompassing case, the emergency-stop circuit will prevent power flow (kill or prevent startup) when the sensor channel being tested is faulty or it is not tested often enough.

Accordingly, it is the object of the present invention to provide a programmable emergency-stop circuit that allows various options for the manner in which kill inputs affect the system and further provides options for the manner in which outputs are activated and deactivated. Included in this is the manner in which test inputs are used and associated with their respective kill inputs. Furthermore, it is an object of the invention to provide programmability to specify the manner and timing for dynamically adding a given input source to the active set of kill inputs. Included in this is the manner in which a given input source is dynamically added to the active set of test inputs and associated with a particular kill input. Finally, it is an object of the invention to employ solid-state circuitry that generally avoids software or a microprocessor, so that new functionality coupled with programmability may be safely incorporated within the emergency-stop circuit.

One important feature of the invention is its state machine, which provides a framework from which the invention operates. Defined by a set of internal signals that includes start and kill-type signals, the state machine specifies when the circuit may be energized, when it is killed, and when startup is inhibited. The internal signals are generated as a programmable function of time and input source states. Other features include audio status for startup and kill, requirements for startup that ensures desired energizing, requirements for a computer ready signal that ensures synchronization with software running on a computer, provisions for a dedicated error-code that identifies power glitches, and the safe oversight of a power-loss period during which a servo-controlled reflex action may be implemented.

The primary advantage for using the invention is that a centralized single circuit can be programmed and employed in a wide variety of machine designs. For a given machine design, for example, the circuit can be reprogrammed and thereby adapted to a different set of operational scenarios. When designing a machine or a plurality of machine/devices, the designer is able to associate any given input source with a desired kill input type that specifies how the input source affects the system. Furthermore, once operational in the field, for example, the machine will require maintenance, and to assist this, the circuit can be definitively reprogrammed from a central location so that certain inputs are temporarily but safely ignored and certain outputs are forced disabled during the maintenance operation. Finally, programmable testing ensures that a sensor channel will not exhibit latent failure, and the designer may also utilize redundancy (a second, independent sensory channel) as necessary for some critical safety function so that the act of testing a sensor channel itself does not expose an unsafe condition. The redundant channel ensures coverage while testing, so that no single fault can cause an unsafe condition.

Other advantages of the invention are related to timing, filtering, and synchronization. One such advantage is the accuracy, and hence repeatability, that can be applied to timing the motors-on button's active period as well as to the timing of the start-up delay that prevents the immediate re-start during the DYING state of a freshly killed circuit. The use of timing and other related digital filters significantly reduces the susceptibility of the circuit to background noise. It is also an advantage from a system performance standpoint that the emergency-stop circuit causes the computer program and, thereby, the entire system to be in synchronization via several novel methods.

The invention will now be described, by way of example and not by way of limitation, with reference to the accompanying sheets of drawings and other objects, features and advantages of the invention will be apparent from this detailed disclosure and from the appended claims. All patents, patent applications, provisional applications, and publications referred to or cited herein, or from which a claim for benefit of priority has been made, are incorporated by reference in their entirety to the extent they are not inconsistent with the explicit teachings of this specification.

BRIEF DESCRIPTION OF THE DRAWINGS

FIGS. 4A–4I illustrate detailed field programmable gate array (FPGA) schematics for the internal logic of the preferred embodiment.

DETAILED DISCLOSURE OF THE INVENTION

Figure 1A:
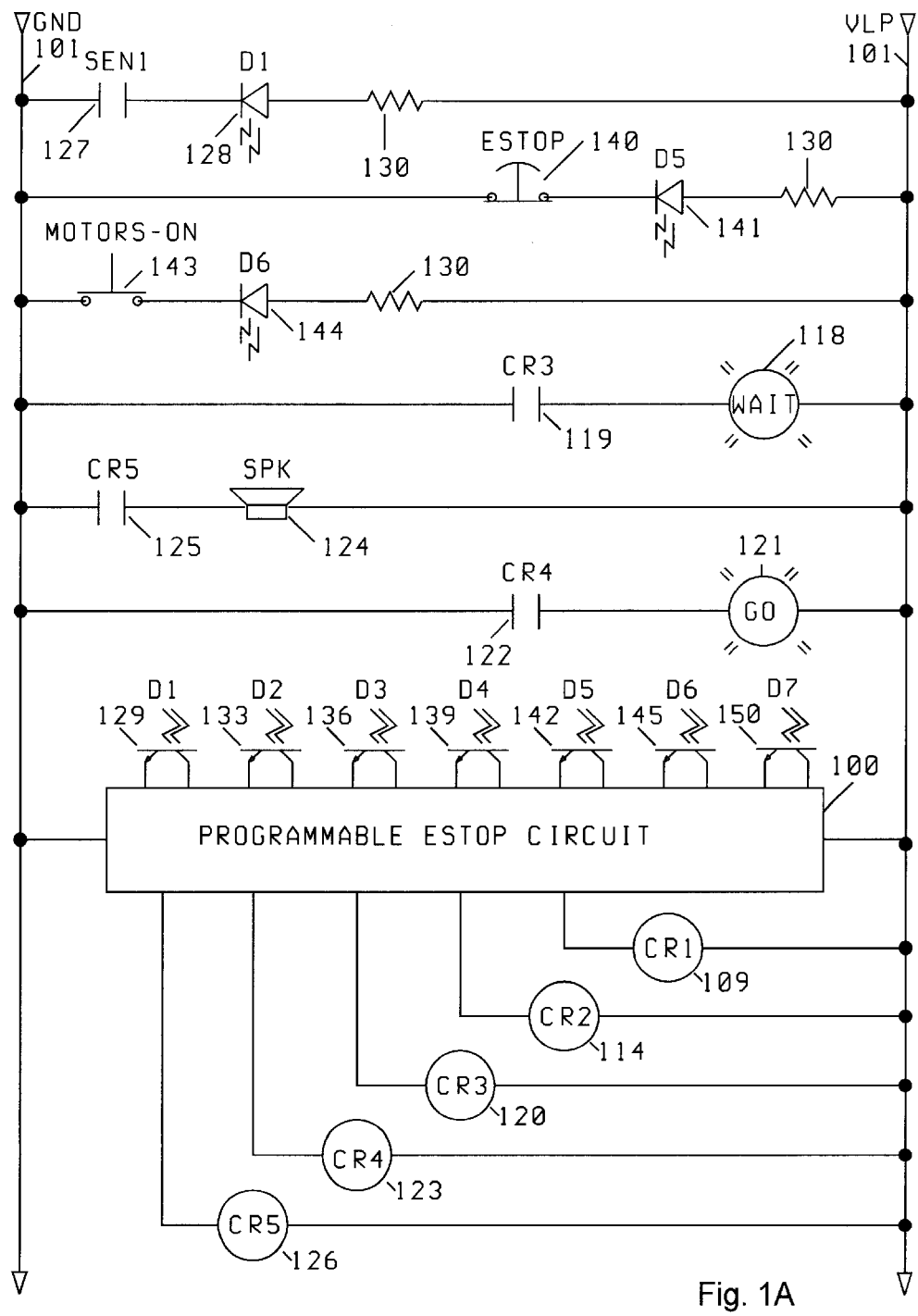
FIGS. 1A–1B illustrates a preferred embodiment of the emergency-stop circuit of the present invention used to control a device having a motion controller.

Referring now to the figures in which like numerals represent like elements throughout several views, the present invention comprises a programmable emergency-stop circuit 100 that is programmable on multiple levels and provides advanced functions not found in other systems. The circuit centralizes the control of high voltage motor power into one place, by providing connections for, in its minimum configuration, several different kill switches, a motors-on button, and an AC motor power relay coil. In contrast with the traditional emergency-stop circuit, which has a serially connected architecture, distributed throughout the machine, the present circuit adopts a more centralized topology. Kill switches, emergency-stop and motors-on buttons, computer ready, watchdog, and test signals are all conveniently connected in one location, alongside the AC motor power relay coil driver.

As described in more detail hereinafter, the invention enhances the traditional emergency-stop circuit by (1) providing programmability so that a single centralized emergency-stop circuit accommodates different kinds of kill switches as well as different kinds of controlled devices in flexible combinations and (2) providing functionality that has either not been achieved prior or achieved in unsafe ways. The programmability facilitates easier, faster design and redesign and safer maintenance operation. The extra functionality is concerned with (1) conducting states of the kill inputs and the secondary outputs with respect to the energizing of the emergency-stop circuit and (2) -issues regarding the power-up of the circuit logic.

There are two recognized types of emergency-stop circuits: stop category 0 and stop category 1. Stop category 0 covers a design where immediate stop is achieved by switching off the primary energy source (uncontrolled stop). Stop category 1 covers the design where after the signal to kill has been given, power remains supplied to the control system until the machine has come to a standstill (controlled stop). The approach adopted by the present invention is generally a combination of these two categories.

Finally, there are many terms used in the present disclosure that are either new, such as "motors-on," or do not conform with standard terms in industry such as "reset." As such, a centralized listing of nomenclature is provided hereinafter as Table A to assist the reader.

TABLE A

Nomenclature

| | |
|---|---|
| Emergency-stop circuit | the circuit responsible for controlling power to the AC motor power relay coil. |
| AC motor power | the AC power that flows through the contacts of the relay which the emergency-stop circuit controls. |
| AC system power | the AC power at entry that powers the entire system and is used to feed the AC motor power. |
| AC motor power relay/ AC relay/ AC relay coil/ AC relay coil driver | the relay, its coil, or a pilot driver for its coil, which controls the flow of power from the AC system power to the AC motor power. |
| DC motor power/DC motor power supply/DC storage capacitor/high voltage DC | the power and the stored energy available after the transformation of AC motor power into a DC power via a diode bridge and filtering capacitor. |
| Logic power/ DC power supplies | power supplies that are required to power sensors or to power digital logic required to drive control signals, including but not limited to the emergency-stop circuit. |
| Energize/kill/ reenergize/ start/restart/ startup | terminology used to describe what is done to the emergency-stop circuit, specifically regarding the starting or the stopping of flow of current to the AC motor power relay coil. |
| Power-up/reset | the application of power to the emergency-stop circuit that is required to power its digital logic and begin operation or refers to resetting the digital logic to the same state attained at power-up. |
| Power glitch event | refers to a momentary interruption in AC system power that causes a reset of the emergency-stop circuit's digital logic, because of a momentary loss of regulation of the logic power. |
| Primary output | the AC motor power relay coil driver signals (RELAY+/−), their required control signals (GO*), other state indicator signals (WAIT*), and any isolated versions (e.g., CGO*, CWAIT*, WAITL+/−, GOL+/−). |
| Enable/inhibit | refers to a digital control signal that is required by equipment in order to function (enable) or in order to stop function (inhibit). An enable is a contact that must be closed for the connected equipment to function (called a normally open NO switch). An inhibit is a contact that must be open for the connected equipment to function (called a normally closed NC switch). These signals are typically logic level signals, unless used to engage or disengage a brake or solenoid. |
| Computer enable | a control signal (CE*) sent by the computer and fed through the emergency-stop circuit for the primary purpose of controlling enable or inhibit signals, which are sent to connected equipment such as power amplifiers. |
| Secondary output | enable or inhibit connections at the emergency-stop circuit, which are controlled by either GO* or CE*. |
| Kill input/ kill switch | a connection to the emergency-stop circuit that is capable of stopping the flow of current to the AC motor power relay coil thereby killing or keeping killed the emergency-stop circuit. This is also called a "safety switch". |
| Active/inactive | the state of a kill input or an enable-type secondary output, i.e., whether it is currently conducting or not or refers to the state of an inhibit-type secondary output, i.e., whether it is currently open or not. |
| FPGA | a Field Programmable Gate Array, which for this design controls the bulk of the logic for effecting the emergency-stop circuit function. |
| Motors-on/ motors-off | the state of the emergency-stop circuit, i.e., whether or not it is energized, which is indicated by the ENERGIZED state indicator, GOL+ (motors-on lamp driver). Motors-on also refers to a momentary push-button switch that plays a role in startup. Others in industry use the word "reset" to refer to the "motors-on" function, and it should be noted that this usage of "reset" conflicts with the usage of "reset" adopted here (see above - Power-up/reset). |
| First motors-on | the period leading up to the first energizing of the emergency-stop circuit since the last power-up/reset. |
| Waiting-for-motors-on (WAITING) | a state of the emergency-stop circuit, when it is ready to energize but needs the operator to press the motors-on button, which is indicated by the WAITING state indicator, WAITL+/− (waiting-for-motors-on lamp driver). |
| Motors-on startup equations | the logic required to energize the emergency-stop circuit that examines the states of kill inputs and motors-on buttons and controls the primary outputs. |
| Kill equations | the logic required to de-energize the emergency-stop circuit. |
| Use/ignore/ falling-type (USE, IGNORE, FALL, FALL-TO): | the configuration of a kill input, in order to specify whether the kill input should be used or ignored in the motors-on startup and kill equations or treated as a falling-type input, which is used only in the kill equations. |
| Select/defeat/ bypass | whether a kill input is used or ignored. |

TABLE A-continued

Nomenclature

| | |
|---|---|
| Clear | returning an inactive kill input to an active (conducting) state. Also refers to clearing the power-up/reset error code that is displayed immediately after power-up/reset. |
| Computer ready | an active low signal (CRDY*) that is used by the computer and the emergency-stop circuit to keep the computer program and emergency-stop circuit in synchronization: the computer uses it to tell the emergency-stop it is safe to energize or to remain energized. |
| Computer watchdog | a signal the computer changes periodically to show the emergency-stop circuit that the program is running normally. The software on the computer must periodically "feed the watchdog", e.g. 0 to 5 VDC, 5 VDC to 0, and then repeat. The circuit will kill power when sufficient time has elapsed since the last toggle, a situation which is indicative of a poorly running or locked-up computer program. |
| Assert/de-assert/reassert/ reactivate | turning a control signal "on" (assert) or "off" (de-assert). Note that "on" is a low voltage for an active low signal which is denoted by an asterisk (e.g. CRDY*). |
| Recycle or cycle | de-asserting a signal that is on and then reasserting it, or alternatively, asserting a signal that is off and then de-asserting it. |
| Motion controller | the hardware and software required for intelligent, servo motion control of a device (where position or velocity is being controlled). |
| Power-loss period | period beginning with the loss of AC motor power and ending with either the total loss of all stored DC motor power or the loss of regulation of any associated logic power supply, whichever comes first. |
| Computer Go (CGO*) | handy communication bus that is used to communicate emergency-stop circuit status with a plurality of motion controllers. |
| Servo reflex/ responsive movement | a movement of short duration in a desirable direction that is in response to a signal which indicates a power-loss period has begun. |
| Power-Loss Broadcast | the use of the Computer Go (CGO*) signal to inform all motion controllers that a power-loss period has begun so that a responsive movement should be started, if desired. |
| Opto-coupler | a device that provides optical isolation between two circuits, used to separate kill inputs from the emergency-stop circuit's local signals and secondary outputs from the emergency-stop circuit's local signals. |
| State Machine | consists of five states that provides the structure for the operation of the circuit. Being in a given state controls whether or not a given input has an effect. |
| Sensitive | when the emergency-stop circuit is "sensitive" to a particular kill input, then the emergency-stop circuit requires the actual kill input signal to be active (if it is not active, then circuit is de-energized). This is a function of programming (e.g. kind of input) and current state of emergency-stop circuit (e.g. WAITING or ENERGIZED) and the current state of the kill input. |

General Features

The emergency-stop circuit 100 of the present invention, as illustrated in FIG. 1A, comprises a basic means for configuration (e.g., jumpers), which permits the controlled defeating (bypassing) of selected kill inputs. Visual status indicators (e.g., LEDs) identify the states of the inputs (active or inactive) and the mode of use (e.g., IGNORE, FALL, or USE). These features together with the circuit's centralized location facilitates quick and accurate assessment of configuration status and integrity. Kill switches are easily connected to the circuit 100. In a preferred configuration, when not defeated, the switches provide a DC signal that conducts (active) to keep the emergency-stop circuit energized. When configured for USE, the switches are also active before the motors-on button can be utilized to re-energize a killed circuit.

Figure 1B:
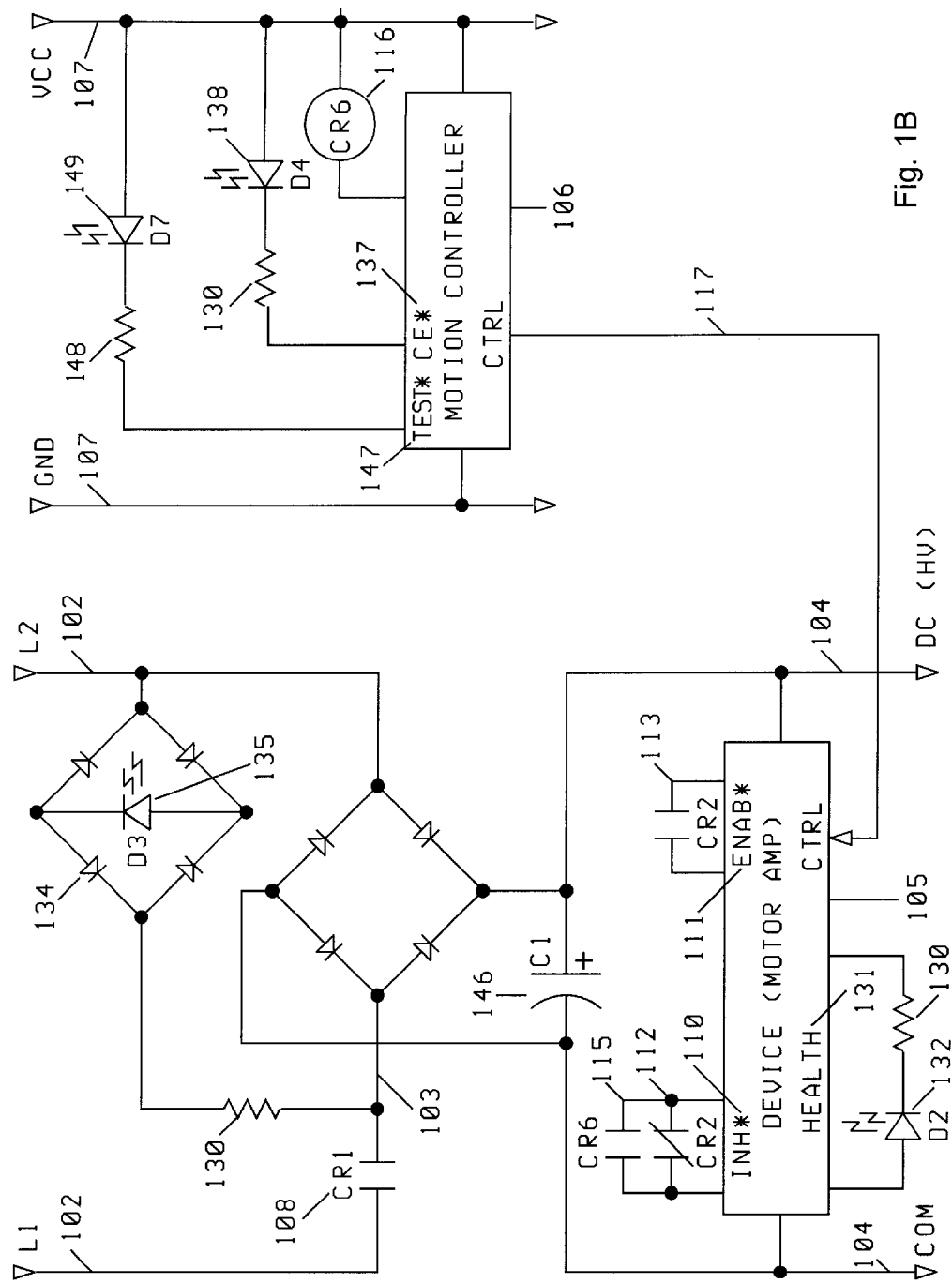

FIGS. 1A and 1B illustrate an example of the invention used in practice. FIG. 1A illustrates connections to the programmable emergency-stop circuit 100, as well as some of the other connections requiring DC logic power 101. Also shown in the figure are the AC system power 102, the AC motor power 103, the DC motor power 104, a typical device 105 powered by DC motor power, a motion controller (computer) 106, and the logic power supply 107 for the motion controller. Note that implicitly, the logic power supplies 101, 107 are derived from 102.

In a unique departure from the traditional circuit, kill inputs of the present invention may alternatively be configured as "falling inputs." As such, these kill inputs will only kill an energized circuit, and will not affect the motors-on startup equation. Specifically, this type of input kills on transition from active to inactive and is useful for connection to a status signal that only becomes active after the emergency-stop circuit becomes energized. Once active, the status signal can go inactive to signify some fault, which in-turn kills the emergency-stop circuit. An example of an input signal requiring this is a health signal that is output by an amplifier whose power is controlled by the emergency-stop circuit. In other words, the health signal cannot conduct until power is applied to the amplifier.

Although handled in a unique way, the feedback monitoring of the AC motor power relay contact voltage is also an example of a falling input, the falling (lowering) of which signifies that there is a power outage. Additionally, these falling inputs (normal or AC-type) can also be assigned a timeout value, which requires that the input become active within a programmed interval after the circuit is energized, and if it does not the circuit is (re-)killed. Other inputs handled by the circuit include computer ready, watchdog, emergency-stop buttons, and the like. Also, the test input is also handled by the circuit. A comprehensive list of preferred input types is listed in the following Table B, which provides a brief description of each:

TABLE B

Input Types of Preferred Embodiment

| | |
|---|---|
| Type A: | kill input that expects a DC signal, may be configured to be ignored, used, or treated as a falling-type. |
| Type B: | kill input that expects a DC signal, may be configured to be ignored or used. |
| Type WD: | watchdog kill input that expects a strobing signal which is indicative of a properly running computer program. It may be configured to be ignored or used. |
| Type R: | computer ready kill input that when active signifies the computer is ready for the emergency-stop circuit to be energized. It possesses additional features and may be configured to be ignored or used. |
| Type AC: | kill input that senses an AC-type strobing signal such as the 60 Hz feedback signal from the AC motor power relay contacts. It may be configured to be ignored or used. |
| Type ATO: | a Type A kill input that also includes a time out feature, so that when configured as a falling-type, the freshly energized circuit is killed in the event that the kill input does not become active within a programmed interval. |
| Type ACTO: | a Type AC kill input that also includes a time out feature, so that when configured as used, the freshly energized circuit is killed in the event that the kill input does not begin strobing within a programmed interval. |
| Type CE (CETO): | a dedicated Type A (or ATO) kill input that also performs a mutually exclusive function related to the control of the secondary outputs. It is usually configured to be ignored when used to control secondary outputs. |
| Type ES: | a kill input that is dedicated for an emergency-stop button, is hardwired to be used. |
| Type MO: | a motors-on signal input that is not a kill input, but rather represents the final command to energize the emergency-stop circuit. |
| Type MC: | a monitor contact signal that is also not a kill input, but rather represents a check that is done when the circuit is killed to ensure that a downstream relay controlled by the primary output of the emergency-stop circuit has fully disengaged |

TABLE B-continued

Input Types of Preferred Embodiment

| | |
|---|---|
| | (contacts are not welded closed). This type of signal is currently used in practice to qualify the motors-on signal, i.e. it can inhibit the motors-on signal from becoming active. |
| Type T: | a test input that is associated with one or more kill inputs. A computer uses this signal to notify the emergency-stop circuit that the associated kill input will soon cycle, thereby demonstrating the kill input works. The Type-T input can also itself be used as a Type-WD input (possesses an embedded Type WD that can be used) to ensure testing is conducted at a desired frequency. |
| Type CLEAR: | a clear signal input that clears a power-up/reset error code in order to reveal a second error code responsible for preventing first motors-on. It can also be used to determine whether a higher priority error code is present. |

The inputs of Table B control the behavior of the preprogrammed core logic of the emergency-stop circuit. The following provides an overview of the basic programmable capabilities of the invention, for example, whether to use or ignore a given kill input or whether to immediately disable or not disable a connected device during the DYING state. This programmability provides the sought after consistent environment for both design and maintenance. The engineer can use these capabilities to ease and accelerate the design and re-design process, to create a machine that may be adaptable to different operating conditions or application functions, or to create a fault tolerant machine that may be easily reconfigured so that continuously failing kill input path can be ignored, thereby permitting additional work to be accomplished. And the technician may quickly see which kill input is causing a shutdown or he can quickly, safely, and consistently disable parts of any given machine in order to test or debug.

Figure 2:
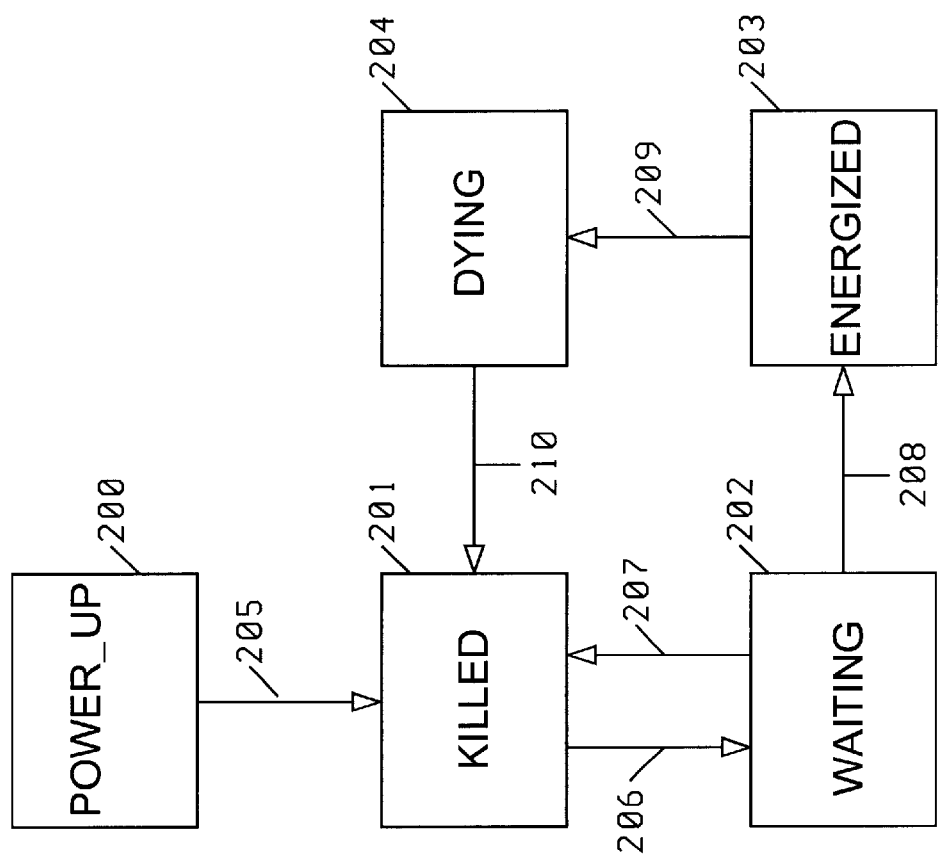
FIG. 2 illustrates a preferred state machine for the present invention.

Let us consider a large subsection of this logic that controls the "primary outputs" and that this portion always emulates a stop category 0 type of emergency-stop circuit. Among other things, this means that this portion of the logic is in one of at least two states: ENERGIZED 203 or KILLED 201 (FIG. 2).

Now, the internal logic of the circuit assembles a vector of "health signals" from the above set of (kill) input types such that the value of the real signal is fed through when the associated kill input is "used" and an active signal is substituted for the kill input temporarily when it is a falling-type or permanently when it is ignored. Also, an active signal is substituted for the kill input temporarily when it is being tested. Consider that the logic is in the KILLED state 201. Once all of the kill inputs and their configurations generate a vector of active health signals, then the logic changes to a third WAITING state 202. This means that the logic is waiting for one of the Type-MO inputs to go active (i.e., waiting for the operator to press a motors-on button). The logic has been designed to wait for an inactive-to-active transition on this input and wait an additional period during which the input must remain stable and active. Once these criteria are satisfied, the logic changes to the ENERGIZED state 203.

It is during the ENERGIZED state 203 that all of the primary outputs are active. The primary outputs are the AC Motor Power Relay Coil Driver (RELAY+/−), Computer Go (CGO*) and Computer Waiting-for-Motors-On (CWAIT*). Although not physically leaving the main circuit board, there are two additional internal signals that are regarded as primary outputs, and they are GO* and WAIT*. Additionally, there are monitors for the above signals (GOL+/−, WAITL+/−), which do leave the main circuit board. Of these signals, the ones associated with the WAITING state are also active during the WAITING state (WAIT*, CWAIT*, WAITL+/−). (Refer to listing of signal names and connector pin-outs for the preferred design hereinafter.)

Once in the ENERGIZED state 203, the logic remains in that state until such time that the vector of health signals contains at least one inactive component. Once this occurs, the logic disables all primary outputs and enters the fourth state: DYING 204. (When entering this state, the vector of health signals is latched, so that the culprit may be identified via an error code.) Now, this state is a transition state that lasts for a programmed interval (e.g., 2 sec.). During this state, the circuit is inhibited from re-starting, and status for this state is provided to the operator using an audible signal. Once the interval expires, the logic transitions back to the KILLED state 201, where nominally, the cycle repeats.

It was noted that the above subsection of logic behaves as a stop category 0 emergency-stop circuit, but this is specifically with regards to controlling the flow of AC motor power. This means that the AC motor power only flows whenever the state is ENERGIZED 203, and this power is removed whenever it is not in that state. This constitutes the overall behavior of this subsection of the core logic. Attention will now be given to the secondary outputs and their use in tailoring the behavior of various connected devices whose power is controlled by the emergency-stop circuit.

Recall from the background material that it is prudent to utilize an enable or inhibit logic level signal in conjunction with the removal of power when optimally suppressing a device from exhibiting uncontrolled motion during a power-loss period. Therefore, when it is desirable that a connected device (e.g. a servo motor with amplifier) behave with stop category 0 characteristics, it should be additionally disabled whenever GO* is inactive, which will disable the power stage of an amplifier or engage a brake. Note that this is one path which a designer may adopt for a particular device.

Alternatively, upon entering the DYING state 204, it is clear that the power-loss period begins. Here, motion controllers may be able to use residual power in the system (e.g., DC motor power) to effect a reactionary movement in a desirable direction. The motion controllers recognize the DYING state 204 by examining the primary outputs.

Immediate knowledge of the beginning of a power-loss period enables a motion controller to perform a "servo-controlled reflex action," which is the responsive movement in a desirable direction. The design of the circuit permits this because of close coupling of signals with the motion controller. (Provisions are required to exist in the motion controller to accommodate and use these signals in order to effect the responsive movement.) The challenge here, though, is to ensure that the device is disabled at some later time, particularly whenever the logic power supply for the motion controller has fallen out of regulation.

Therefore, utilizing the present invention, the designer may adopt a second course for some particular device so that the device behaves with characteristics more akin to stop category 1. Specifically, this means that power remains supplied to the control system albeit for a short period of time, permitting the device a period of time to perform a reactionary movement and come to a controlled stop.

Specifically, the emergency-stop circuit 100 is programmed so that a given device whose power is controlled by the emergency-stop circuit will either be immediately disabled or not immediately disabled when the circuit enters the DYING state 204. This is accomplished by programming the secondary outputs (SO) that are enable or inhibit signals which are prevalent in machine subsystems such as lasers, robots, and servo motor amplifiers. The source of each enable (or inhibit) may be set (e.g., using configuration jumpers) to GO* or CE* (Computer Enable) to control the behavior of the connected device during a power-loss period. Furthermore, each of the secondary outputs may be programmed to be OFF, which disables the connected device regardless of emergency-stop circuit status. This latter setting is useful during a test or debug mode so that the power to the device is not required to be removed or re-wired. Also, a device, such as a robot, can remain on-line (powered, disabled, but communicating) so that it could continue to communicate with the local computer via a serial port connection, for example. Visual status for the secondary output preferably identifies the states of the outputs (active/inactive) and the mode of use (USE_GO*, USE_CE*, or OFF).

The present invention also provides two additional levels of programmability. The next higher level of programmability permits the selection of the type of kill input that is connected to a given input. For example, a given kill input may be programmed to act as either a Type A or a Type ATO, depending on the setting of a multiplexor. Other more elaborate combinations are obviously available. Though in practice, this requires plenty of logic, and this may not be necessary, when one considers the highest level of programmability.

The highest level of programmability is found, for example, when one considers that the core logic of the invention is implemented using a Field Programmable Gate Array (FPGA). Here, the totality of the logic is downloaded to the circuit in the field. Conceivably, this logic could be altered in the field so that the machine would adapt to differing operational environments as needed. First of all, digital filters that are embedded within the input types could be altered in order to better handle a particular operational scenario (e.g., noise concerns). Moreover, motors-on timing and DYING state intervals may be reprogrammed. Also, important watchdog and Type ATO timeout periods may be reprogrammed in the field so that they are tailored to specific conditions. For example, setting up a machine to run faster usually requires a shorter watchdog period for the same level of safety. Furthermore, kill input types can be re-associated with particular inputs, obviating the need for the aforementioned multiplexors. Likewise, test inputs can be re-identified and re-associated with their kill inputs. Finally, the lowest level of programmability may be completely hard-coded, thereby fully establishing the usage of the kill inputs and the behavior of the secondary outputs.

In addition to the above-noted programmability, in other embodiments, the present invention also provides audio status to simulate mechanical relay sounds. It has been observed that solid state relays make no noise when they are energized and are becoming more prevalent, replacing the standard electro-mechanical type. The use of audio status (a speaker) in the present invention is novel to simulate the audible closure of the contacts of an electromechanical relay whenever the actual relay is solid state. The audio status mechanism will emit a chirp (high frequency or short duration) when the circuit is energized, and a dull buzz (low frequency or longer duration) whenever the circuit is killed. The FPGA (Field Programmable Gate Array) digital logic section of the main circuit board controls the frequency and/or duration of the speaker signal. A simple decrementing counter operating at a desired frequency can be used. Typical application will simply use an internal signal that is active when the circuit is in the DYING state (the period when it is inhibited from restarting) to control the dull buzz.

Another novel feature of the present invention is the Power-Loss Broadcast. This occurs during the power-loss period, which is the period beginning with the loss of AC motor power and ending with either the total loss of all stored DC motor power or the loss of regulation of any associated logic power supply, whichever comes first.

Via the broadcast, immediate knowledge of the state of AC motor power failure allows the controllers time to initiate a servo-controlled reflex action, which is a responsive movement in a desirable direction. This responsive movement can be used, for example, to lift a spindle from the material in which it is cutting. Power for the responsive movement is garnered, for example, from the large storage capacitor that is filtering the high voltage DC motor power supply. Once this power has expired and the motors have stopped, no further motion can be achieved until the emergency-stop circuit is re-energized.

The Power-Loss Broadcast enables multiple axes of a machine to simultaneously react to AC motor power failure and move the system as a whole towards a more desirable configuration. An example of Power-Loss Broadcast requiring multiple axes is a robotic grinder. The part can be saved, should AC motor power fail during operation, if the axes of the robotic grinder were to react in a coordinated fashion, so that grinder is removed from the workpiece surface. In this case, the Power-Loss Broadcast is an enabling technology, since the motion controllers (or motion control system) must still know how far and in which direction to move the individual axes. Note that this is a common problem formulation in robotics referred to as a reverse analysis, where given the desired displacement of the end-effector (grinder) of the robot, it is necessary to calculate the individual axis displacements.

The Power-Loss Broadcast feature is activated when AC motor power is killed, either because the emergency-stop circuit killed it after a kill input went inactive or through the loss of incoming AC system power. The circuit has been designed so that the difference between these two cases is minimal.

In the first case, the emergency-stop circuit decides when, based on conditions such as status of kill inputs, to open the AC Relay Coil Driver (RELAY+/−), thereby killing AC motor power. It then broadcasts this state by driving the Computer Go (CGO*) signal inactive (primary outputs are de-asserted). The emergency-stop circuit behaves in the exact same way in the second case, when the emergency-stop circuit senses (via a dedicated Type-AC kill input) that AC motor power is dying as a result of the loss of incoming AC system power. Here though, DC power powering the logic on the emergency-stop circuit is also failing, but the assumption here is that this DC power remains stable for a short period of time.

In practice, the only difference between these two cases is the length of the power-loss period. For the first case, it depends only on how long the energy stored in the DC motor power supply lasts, while in the second case it also depends on how long the associated logic power supplies remain in regulation. When these logic supplies remain in regulation longer than the energy stored in the DC motor power supply lasts, then effectively, there is no difference. This effect can be achieved through the use of short duration uninterruptable power supplies.

In order to take advantage of this feature during the power-loss period, it is important that the motion controller be allowed to function to effect the responsive movement. In other words, the amplifier section should not be disabled (inhibited). This is true with the caveat that associated logic power supplies must be functional (in regulation).

A further novel feature of the present invention deals with the computer ready signal. The unique approach taken in the current design regarding the use of the computer ready signal is safety conscious to ensure that the computer software is synchronized with the emergency-stop circuit. Whenever the emergency-stop circuit has been killed because of an inactive kill input, a recycling of the Computer Ready (CRDY*) signal (the Type R input) is required in order to re-energize the circuit, which means an active computer ready signal must be de-asserted and then reactivated to acknowledge that the circuit was killed. The motivation for this is to force the computer program to be synchronized with the emergency-stop circuit. In the special case when the computer ready was the signal that killed the emergency-stop circuit (by going inactive), additional toggling is not required, because the logic contained in the FPGA section needs to ordinarily see an inactive-to-active transition on the computer ready signal to satisfy the motors-on startup equations, and the simple re-assertion of the computer ready satisfies this requirement.

A further scenario arises worthy of note is concerned with the requirements of the computer ready signal just after the power-up or reset of the main circuit board for the emergency-stop circuit. (A discussion of the computer program's recognition of this condition follows.) In this case, multiple recycles are required—three or more inactive-to-active transitions—in order to safely energize the circuit for the first motors-on period. It is assumed that three recycles would not occur naturally due to the simple application of power to the computer hardware which drives the CRDY* signal. If this three-active-edge technique were not adopted and if the computer hardware design were to force the CRDY* signal to begin in an active state (low), then the emergency-stop circuit would incorrectly recognize an inactive-to-active transition as a valid one, even though the software is not yet running.

Therefore, when three such recycles do occur after the computer boots, it is considered to be the result of safe, desired toggling controlled by the computer program which communicates with the emergency-stop circuit.

Finally, an obvious design change should be noted here. The Type R input could also be programmed to require three inactive-to-active transitions for each motors-on period (not just the first). Like the Type WD input, this helps to cover the case when a computer is rebooted.

A further novel feature is the dedicated power-up/reset error code and its use as well as how error codes are used in general. A dedicated error code is driven in response to a main circuit board power-up/reset to signify that a logic power supply fault has occurred, and this condition is used by the computer to suspect that sensors connected to the same or other power supplies have had a power interruption. For example, such a sensor could be a motor encoder, which is mounted on a motor to provide pulses in response to motor shaft movement. These pulses are counted at the motion controller to keep track of incremental displacements from a known home position. An interruption of power to the motor encoder could conceivably result in lost pulses that causes the motion controller to lose track of the motor shaft's real position, a condition which requires re-initialization (re-homing).

The preferred design employs a 2-digit seven-segment LED to display error codes and drives the code at the computer signals connector. (Refer to pinouts of all of the connectors for the preferred design hereinafter.) The manner in which error codes are shown on the 2-digit LED display and driven at the computer signals connector differs depending upon whether the emergency-stop circuit has been energized at least one time, i.e., before or after "first motors-on." The logic of the FPGA keeps track of whether motors have been powered since the logic began functioning, which begins after the FPGA has downloaded configuration data from a serial EPROM in response to a reset cycle controlled an industry standard power supply monitor (MAX705). The power supply monitor monitors the integrity of the incoming 5VDC power and asserts a RESET* signal whenever the incoming power dips below 4.65VDC and de-asserts (releases) RESET* when the incoming power rises above an acceptable level. The release of the RESET* signal begins configuration of the FPGA, resets the internal state (clears all internal flip-flops) of the FPGA, and finally starts the functioning of the FPGA logic.

Because the FPGA begins with cleared logic after configuration, the circuit cannot distinguish between a power-up from a cold start and a power glitch that causes a reset cycle. This should not be an issue when using the power-up/reset error code in practice, since either should be followed by an initialization of sub-systems, that is to say that homing commands should be sent to the motion controllers. The greatest benefit for the use of the error code is found in the event that a power glitch occurs such that the computer remains running but the logic supply powering the encoders (and emergency-stop circuit) fails. Here, the computer program continues running throughout the glitch and depends upon this error code to tell it that a glitch has occurred and that re-home commands should be sent to the motion controllers.

Specifically, immediately after power-up/reset and FPGA configuration, the 2-digit LED display shows a unique code (E.P. in the preferred design) and drives the code of 15 at the computer signals connector on the CERR signals. (See table of error codes for the preferred design hereinafter.) Unless cleared by the pressing of a dedicated button (CLEAR) on the main circuit board or by the use of a Type CLEAR input, this error code remains displayed regardless of the condition of other kill inputs until such time as the first motors-on occurs, at which time normal operation commences.

Normal operation with motors-on consists of an error code of 0 (no error) being shown on the 2-digit LED display and being driven on the computer signals connector. Subsequently, normal operation continues with motors-off whenever the circuit is killed due to an inactive kill signal. Then, the 2-digit display shows and the signals drive the code that is indicative of the source of the killed circuit. The error code remains displayed in this way until either the motors are restarted or until a second error code is found, which may occur before the motors are restarted but after the first error code is cleared (returned to a conducting state). The second error code is useful for deducing which kill input is now inactive and preventing the motors from restarting. The cycle of clearing a kill input and the displaying of a different error code continues until such time that the operator is able to restart motor power. The operator knows when the kill input—corresponding to last error code displayed—has been cleared, because the waiting-for-motors-on LED and lamps are lit and the CWAIT* signal is being driven at computer signals connector. Under normal operations, the computer program can use the CERR and CWAIT* signals to inform the operator which kill input needs to be cleared and whether it has been cleared, and when all is ready, the computer program can inform him to restart motors by pressing the motors-on button.

The design of the logic forces the display of the power-up/reset error code until first motors-on, which is necessary so that other codes do not overwrite it. (For example, immediately overwriting the code of 15 with 1, should Input #0 be used and inactive, would prevent the software program running on the computer from determining that a power glitch has occurred.) For the case of an inactive kill input before first motors-on, the computer program realizes that one exists because the waiting-for-motors-on signal (CWAIT*) is not active. In this case, the computer program logs the power glitch event corresponding to the power-up/reset error code and then instructs the operator to press the dedicated CLEAR button on the main circuit board so that a new error code may be displayed indicative of the actual kill input preventing the first motors-on. Then, after the CLEAR button has been pressed, normal operations commence with motors-off. In the case when CWAIT* is active before first motors-on, the use of the CLEAR button is not required, and the computer program can simply log the power glitch event and then command the operator to press the motors-on button, at which time normal operations commence with motors-on.

Finally, regarding normal operations for error codes, it is useful to note what happens in the case where multiple kill inputs are inactive. To accommodate this, a hierarchy has been established which means that the error code displayed is the one possessing the highest priority within the group of inactive kill inputs. In the design that was implemented to verify the invention, the power-up/reset error code (15) has the highest priority, the Input #0 error code (1) has the next highest, and the e-stop button error code (14) has the lowest.

The state machine of the present invention will now be described with reference to FIG. 2. The state machine provides a framework from which the invention operates. It is defined by five states (POWER-UP 200, KILLED 201, WAITING 202, ENERGIZED 203, and DYING 204) and those conditions that change the present state to the next state. These items will discussed in a general way here.

The emergency-stop circuit begins operation in the POWER-UP state, and while in this state, the circuit is inhibited from being energized to give adequate time for the digital filters of the circuit to initialize. After a programmed interval, the state changes into the KILLED state, and while in this state, the circuit is likewise inhibited from energizing. The state remains in the KILLED state 201 until the following conditions occur:
  a) the Types A, B, R, ATO, CE, CETO kill inputs that are programmed for USE are active unless being tested, where each that is associated with a Type-T input properly cycles whenever the Type-T is asserted,
  b) the Type WD kill inputs that are programmed for USE are active (i.e. each strobes at an interval that is shorter (faster) than its corresponding programmed interval), and each Type-T input used as a Type WD and associated with a kill input from (a) strobes at an interval shorter (faster) than its corresponding programmed interval,
  c) the Type ES kill inputs are active,
  d) the Type R kill input (if existing and used) has been recycled the appropriate number of times (3 if first motors-on or 1 if not), and
  e) the circuit does not have any internal errors.
Once the above transpires, the circuit transitions into the WAITING state 202.

Once in the WAITING state 202, the circuit is ready to energize, and the outputs associated with the WAITING state become active (e.g., WAIT*, CWAIT*, WAITL+/−). Changing from the WAITING state nominally requires two conditions from one of the motors-on input signals: (1) an inactive-to-active transition and (2) a stable active signal for a programmed interval. Following this, the state transitions into the ENERGIZED state 203. On the other hand, if while in the WAITING state, one of the following conditions occurs, the state will return to the KILLED state 201:
  a) one of the Types A, B, R, ATO, CE, CETO kill inputs that is programmed for USE becomes inactive during a non-testing period, or fails a test when it is associated with an active Type T input,
  b) one of the Type WD kill inputs that is programmed for USE goes inactive (i.e. it does not change value during its corresponding programmed interval), or one of the Type T inputs used as a Type WD and associated with a kill input that is being used fails to cycle,
  c) one of the Type ES kill inputs is inactive, or
  d) the circuit has an internal error.

Once in the ENERGIZED state 203, the remaining primary outputs are enabled (e.g. RELAY+/−, GO*, CGO*, GOL+/−). The state remains in the ENERGIZED state until one or more of the following happens:
  a) one of the Types A, B, R, ATO, CE, CETO kill inputs that is programmed for USE changes from active to inactive during a non-testing period, or fails a test when it is associated with an active Type T input,
  b) one of the Type WD kill inputs that is programmed for USE goes inactive (i.e., it does not change value during its corresponding programmed interval), or one of the Type T inputs used as a Type WD and associated with a kill input that is programmed for USE fails to cycle, or one of the Type T inputs used as a Type WD and associated with an activated kill input programmed for FALL or FALL-TO fails to cycle,
  c) one of the Type ES kill inputs is inactive,
  d) one of the Types A, ATO, CE, or CETO kill inputs that is programmed for FALL or FALL-TO becomes active then changes to inactive during a non-testing period, or becomes active but later fails a test in the case where it is associated with an active Type T input,
  e) one of the Type ATO or CETO kill inputs that is programmed for FALL-TO does not become active within a programmed interval,
  f) one of the Types AC or ACTO kill inputs that is programmed for USE begins strobing, but then stops,
  g) one of the Type ACTO kill inputs that is programmed for USE does not begin strobing within a programmed interval, or
  h) the circuit finds an internal error.

Whenever one of the above occurs, the state changes to DYING 204. In the DYING state, the circuit is inhibited from restarting. The circuit remains in the DYING state a programmed period of time, and then it transitions back to the KILLED state 201, where nominally, the cycle repeats.

Finally, regarding specific features of the invention, there are novel features of the invention that relate to the use of solid-state circuitry. The introduction of solid-state circuitry in the application of emergency-stop circuitry is necessary in order to achieve the benefits that have been presented here. In general, solid-state components are more reliable and more accurate than their electromechanical counterparts. But, on the downside, they are more susceptible to noise, which presents a major hurdle that is necessary to overcome before the technology can be safely employed. It is believed that the novel redundancies inherent in the current design are more than sufficient to make the circuit impervious to background electrical or magnetic noise. It is anticipated that additional redundancy not disclosed herein may be employed in the practice of the invention, as it is done now for similar circuits, for example, employing dual identical circuits. The redundancy in the dual circuits help in the case when one sensor channel is being tested, since the system can safely rely on the other redundant channel during the test.

The use of solid-state also requires DC logic power, but it is anticipated that this power is required anyway in applications where the circuit will be used. Here the circuit also monitors the logic power, so that it then becomes a known-good supply which can be used to power motor encoders and the like.

The use of solid-state technology and specifically the Field Programmable Gate Array technology is novel when applied to the emergency-stop circuit. This provides the best of two worlds. The circuit can be programmed and reprogrammed, even though it runs no software and has no processor. Once configured at power-up/reset, it functions as electronic hardware, an assemblage of gates and flip-flops. The serial kill switch topology seen in the traditional circuit is replaced by a centralized kill input topology wherein the kill inputs and their configuration signals are filtered and gated inside the FPGA in order to generate a composite kill signal.

It is important to note that the ability to be reprogrammed in the field permits the adjustment of internal settings so that the circuit may be tailored to a specific application. For example, the de-bounce filter parameters or the computer watchdog timeout can be altered to provide different circuit behavior that is better suited for a particular application.

One of the greatest benefits enjoyed when employing this technology is the accuracy, and hence repeatability, that can be applied to timing the motors-on button's active period as well as to the timing of the start-up delay that prevents the immediate re-start during the DYING state of a freshly killed circuit.

Configuration of a Preferred Use of the Invention

FIGS. 1A and 1B illustrate an example of a preferred embodiment of the invention. FIG. 1A illustrates circuit connections to the programmable emergency-stop circuit 100, as well as some of the other connections requiring DC logic power 101. Also shown in the figure are the AC system power 102, the AC motor power 103, the DC motor power 104, a typical device 105 powered by DC motor power, a motion controller (computer) 106, and the logic power supply 107 for the motion controller. Note that implicitly, the logic power supplies 101, 107 are derived from 102.

In this preferred embodiment, the outputs from the emergency-stop circuit 100 control the coils of five relays. The AC motor power 103 is controlled by CRI relay NO contacts 108 via CR1 relay coil 109. The inhibit input 110 to the device 105 is controlled by the CR2 relay NC contacts 112 via CR2 relay coil 114, or the enable input 111 is controlled by CR2 relay NO contacts 113 via CR2 relay coil 114. (The CR2 is shown as a Form C contact, but in practice either the NC or NO connection is omitted depending on whether the device possesses only an enable or inhibit input.) The WAITING state indicator 118 is controlled by CR3 relay contacts 119 via CR3 relay coil 120. The ENERGIZED state indicator 121 is controlled by CR4 relay contacts 122 via CR4 relay coil 123. The final output shown is the speaker 124 which is controlled by CR5 relay contacts 125 via CR5 relay coil 126.

Also, in the example, the emergency-stop circuit has seven inputs which are driven by detectors of seven optical isolators. Sensor SEN1 127 sends current limited by resistor 130 through the emitter 128 of an optical isolator, which controls the detector 129 connected to the circuit. Likewise, the HEALTH 131 of the device 105 sends current through the emitter 132 of a second optical isolator, which controls the detector 133 connected to the circuit. The AC diode bridge 134 uses low currents limited by resistor 130 in order to send current through the emitter 135 of the third optical isolator, which controls the detector 136 of the circuit. The motion controller 106 uses the Computer Enable signal 137 to send current through the emitter 138 of the fourth optical isolator, which controls the detector 139 of the circuit. The emergency-stop button 140 sends current through the emitter 141 of the fifth optical isolator, which controls the detector 142 of the circuit. Also, the motors-on button 143 sends current through the emitter 144 of the sixth optical isolator, which controls the detector 145 connected to the circuit. Finally, the TEST* signal 147 when active sends current through the resistor 148 and emitter 149 of the seventh optical isolator, which controls the detector 150 connected to the circuit. These inputs may be thought of as assuming the types listed in the following table.

TABLE 1

Types of switches used in example

| Switch in Example | Type of Switch |
|---|---|
| D1 SEN1 127 | Type A, ATO, B, R, or WD |
| D2 HEALTH 131 | Type A or ATO (set to IGNORE or FALL) |
| D3 AC motor power feedback 134 | Type AC or ACTO |
| D4 Computer Enable 137 | Type CE or CETO |
| D5 Emergency-stop button 140 | Type ES |
| D6 Motors-on button 143 | Type MO |
| D7 TEST* for SEN1 147 | Type T |

The motion controller 106 is shown in the figure in order to fully address the power-loss period issues. The motion controller commands the device 105 via control signals 117. The motion controller may inhibit the device at the inhibit input 110, by using the CR6 NO relay contacts 115 via CR6 relay coil 116. The final connections to the motion controller are the Computer Enable (CE*) 137 and the test signal (TEST*) 147 used for testing the SEN1 sensor. Note that means required to actually test the sensor (e.g. motors, flap to cover an infrared intrusion sensor) are implicitly present.

FIG. 2 illustrates the state machine for the invention, which illustrates the five preferred states previously described: POWER-UP 200, KILLED 201, WAITING 202, ENERGIZED 203, and DYING 204. The conditions that cause changes in state were also previously described: programmed (power up) interval elapsed 205, circuit health, activation and successful testing of used and Type ES kill inputs and proper recycling of Computer Ready signal 206, circuit not healthy or deactivation or test failure of a used or Type ES kill input 207, motors-on button requirements satisfied 208, circuit killed 209, and programmed (dying) interval elapsed 210.

For the example illustrated, the following table shows the values of the outputs relative to each of the five states. There are three entries for CR2, depending on whether the secondary output has been configured for USE_GO*, USE_CE*, or OFF.

TABLE 2

Outputs as a function of state

| | Power-up | Killed | Waiting | Energized | Dying |
|---|---|---|---|---|---|
| CR1 | OFF | OFF | OFF | ON | OFF |
| CR2, configured for USE_GO* | OFF | OFF | OFF | ON | OFF |
| CR2, configured for USE_CE* | OFF | OFF | OFF | Depends on Computer Enable (D4) | Depends on Computer Enable (D4) |
| CR2, configured for OFF | OFF | OFF | OFF | OFF | OFF |
| CR3 (WAIT state indicator) | OFF | OFF | ON | ON | OFF |
| CR4 (ENERGIZED state indicator) | OFF | OFF | OFF | ON | OFF |
| CR5 | OFF | OFF | OFF | ON then OFF | ON |

It is worthwhile to revisit the navigation of the state machine specifically applied to the example shown in FIG. 1. Here, after power-up, the DC logic power supply 101 becomes stable, and the emergency-stop circuit begins operation in the POWER-UP state. It remains in this state for a programmed interval that permits the circuit ample time to initialize all filters. During this state, all outputs are inhibited, which is exemplified in Table 2. Following this, the circuit enters the KILLED state, where again all outputs are inactive. The circuit remains in this state until all of the following happens, which transitions the state to WAITING:

a) the circuit does not have any internal errors,
b) emergency-stop switch 140 is closed,
c) the kill input 139 corresponding to CE* 137 is active if configured for USE,
d) the kill input 129 corresponding to SEN1 127 satisfies the criteria that depends on its type (see Table 3),
e) if the kill input 129 is set to USE, the associated test input 150 corresponding to TEST* 147 cycles (initiates tests) at a rate faster than a programmed value when the test input is being used as a Type WD.

TABLE 3

WAITING state criteria for first kill input

| Input Type | Criteria |
|---|---|
| Type A or B or ATO | If set to USE, the kill input must be active unless being tested by the associated test input D7 150, when it must properly cycle. |
| Type WD | If set to USE, the kill input must be active (toggles) unless being tested by the associated test input D7 150, when it must stop toggling. Toggling means it must change (strobe) at regular intervals at a rate faster than a programmed value. |
| Type R | If set to USE, the kill input must recycle the appropriate number of times and then remain active unless being tested by the associated test input D7 150, when it must properly cycle. It must be recycled three times if the circuit has not energized at least once, and one time if it has. |

Once the circuit is in the WAITING state, the circuit is ready to energize, and the outputs are as described in Table 2. In order to change from this state, the circuit requires that the motors-on momentary button 143 be pressed and remain pressed for a programmed interval. Following this, the circuit transitions into the ENERGIZED state, for which in general all of the outputs become active (see Table 2). On the other hand, the circuit may revert back to the KILLED state from the WAITING state if one of the following occurs:

a) the circuit finds an internal error,
b) emergency-stop switch 140 opens,
c) the kill input 139 corresponding to CE* 137 becomes inactive if configured for USE,
d) the kill input 129 corresponding to SEN1 127 does not satisfy the criteria that depends on its type (see Table 3).
e) if the kill input 129 is set to USE and the associated test input 150 corresponding to TEST* 147 does not cycle fast enough when the test input is being used as a Type WD.

However, once the circuit does enter the ENERGIZED state, the circuit remains in that state until such time as one of the following occurs:

a) the circuit finds an internal error,
b) emergency-stop switch 140 opens,
c) the kill input 139 corresponding to CE* 137 does one of the following:
  i) becomes inactive if configured for USE,
  ii) it goes active and then inactive if configured for FALL (or FALL-TO), or
  iii) if programmed as a Type CETO and is configured for FALL-TO, it does not become active within the programmed interval,
d) the kill input 136 corresponding to the AC motor power sense line 134 if configured for USE begins strobing, but then ceases,
e) the kill input 136 corresponding to the AC motor power sense line 134 is programmed as a Type ACTO input, is configured for USE, and does not begin strobing within a programmed interval,
f) the kill input 133 corresponding to the HEALTH 131 of the device 105 if configured for FALL (or FALL-TO) becomes active and then goes inactive,
g) the kill input 133 corresponding to the HEALTH 131 of the device 105 if programmed as a Type ATO input that is configured for FALL-TO does not become active within a programmed interval, or
h) the kill input 129 corresponding to the SEN1 127 satisfies a criterion listed in Table 4 that depends on the programmed input type.
i) the associated test input 150 corresponding to TEST* 147 does not cycle fast enough when the test input is being used as a Type WD and when the emergency-stop circuit is sensitive to the kill input 129 (requires actual signal 129 to be active).

TABLE 4

Situations where first kill input kills circuit

| Input Type | Criteria |
|---|---|
| Type A | Programmed for USE and changes from active to inactive when not being tested or fails to cycle when being tested, or programmed for FALL, becomes active but goes inactive when not being tested or becomes active but fails to cycle when being tested. |
| Type B | Programmed for USE and changes from active to inactive whenever not being tested, or fails to cycle when being tested. |
| Type WD | Programmed for USE and does not change value (toggle) within the programmed interval when not being tested, or fails to stop toggling when being tested. |

TABLE 4-continued

Situations where first kill input kills circuit

| Input Type | Criteria |
|---|---|
| Type ATO | Programmed for USE and changes from active to inactive when not being tested or fails to cycle when being tested, programmed for FALL-TO, becomes active but goes inactive when not being tested or becomes active but fails to cycle when being tested, or programmed for FALL-TO, and does not become active within the programmed interval. |
| Type R | Programmed for USE and changes from active to inactive when not being tested or fails to cycle when being tested. |

Whenever one of the above occurs, the state changes to DYING. In the DYING state, the circuit is inhibited from restarting. The circuit remains in the DYING state a programmed period of type, and when it transitions back to the KILLED state, where nominally, the cycle repeats.

The use of the secondary output(s) for FIG. 1 will now be described. The current invention is able to accommodate traditional technology that depends upon enabling and/or inhibiting servo amplifiers, and the example illustrated in FIGS. 1A and 1B demonstrate this, when one considers the device 105 to be a servo motor amplifier. Now, a traditional motion controller 106 is closely coupled to the computer, and the enable or inhibit (e.g. 115) connection is typically made from the computer or motion controller directly to the motor power amplifier via an opto-coupler, thereby bypassing the emergency-stop circuit 100. Consider this as wiring option #1, which was discussed in the background material along with its shortcomings.

On the other hand, allowing the new emergency-stop circuit 100 to directly control the inhibit using 112 (or enable using 113) is considered here to be appropriate, but in light of the typical circuit, it is not obvious. Consider this as wiring option #2. With the secondary output (SO) connected to CR2 relay coil 114 programmed to USE_GO*, the amplifier is immediately disabled (inhibited) when AC motor power 103 is killed and remains so throughout the remaining power-loss period. There does not exist the possibility of powered, uncontrolled motion even if charge in the DC storage capacitor 146 outlasts the lives of the DC logic power supply 101 powering the emergency-stop circuit and the DC logic power supply 107 powering the motion controller and/or computer.

This is good design practice, although in the case of startup when the motion controller may or may not be ready to perform feedback control. To accommodate this, consider that the inhibit input at the amplifier is an active low signal (e.g. INH* 110) which has a pull-up resistor to ordinarily keep the amplifier active, and that the emergency-stop and motion controller both have connections to it as explicitly shown in FIG. 1B. Consider this as wiring option #3. In this design, either the emergency-stop circuit or the motion control circuit may inhibit the amplifier. In practice, both sources drive the signal to inhibit the amplifier, with the emergency-stop circuit leading the motion controller circuit during a power-loss period. On startup, the emergency-stop circuit also leads the motion controller's release of the inhibit, with the latter executing software to begin feedback control. This is a better design in the sense that the amplifier 105 is inhibited whenever AC motor power 103 is killed, associated logic power supplies 101, 107 are dead, or whenever the motion controller 106 is not ready to drive motor position.

If, however, the designer wishes to take advantage of the Power-Loss Broadcast in the traditional motion controller configuration, he should program the secondary output to USE_CE*, and configure the computer to drive CE* (Computer Enable 137). The signal CE* is basically a feed through of inhibit control from the computer through the emergency-stop circuit to the amplifier, although programming options do exist internally to "qualify" the signal. Note that because of this signal, the in-parallel signal (e.g. CR6 relay contacts 115) from the computer directly to the amplifier may not be required, and if it is not used, then CE* kill input corresponding to D4 139 should be programmed to IGNORE so that the signal does not kill the circuit. This latter case reverts us back to wiring option #2 but offers different behavior than that explained above because of the different programming of the secondary output.

Now, while employing the computer enable and USE_CE* option, the computer or motion controller may keep the amplifier enabled during the power-loss period so that the motion controller can appropriately move the motor using residual power from the DC storage capacitor 146. This shifts control of the amplifier inhibit circuit in favor of the computer and motion controller. However, the emergency-stop circuit can still inhibit the amplifier 105 in this power-loss period scenario. At some time after failure of AC system power 102, the DC logic power supply 107 powering the computer will fall out of regulation, which is distinguished by the computer no longer driving CE*. The emergency-stop circuit senses the loss of CE* and in-turn inhibits the amplifier. Alternatively, the DC logic power supply 101 for the emergency-stop circuit may cease to function first, which because of the circuit design (employing the CR2 NC relay contacts 112) also has the desirable effect of inhibiting the amplifier. (Note: The logic supply powering the emergency-stop circuit typically also powers the feedback sensor, so an amplifier inhibit is considered necessary, since reliable feedback control is no longer possible.)

These power fail issues justify the use of CE* and its feed through to the amplifier via the emergency-stop circuitry. This is true for either wiring options #2 or #3. It creates an environment that allows safe use of the Power-Loss Broadcast and associated responsive movement in the traditional motion controller-amplifier design. As in the case of USE_GO*, there does not exist the possibility of powered, uncontrolled motion even if charge in the DC storage capacitor 146 outlasts the lives of the DC power supplies 101, 107 powering the emergency-stop circuit, motion controller, and/or computer.

Internal Circuitry

Figure 3:
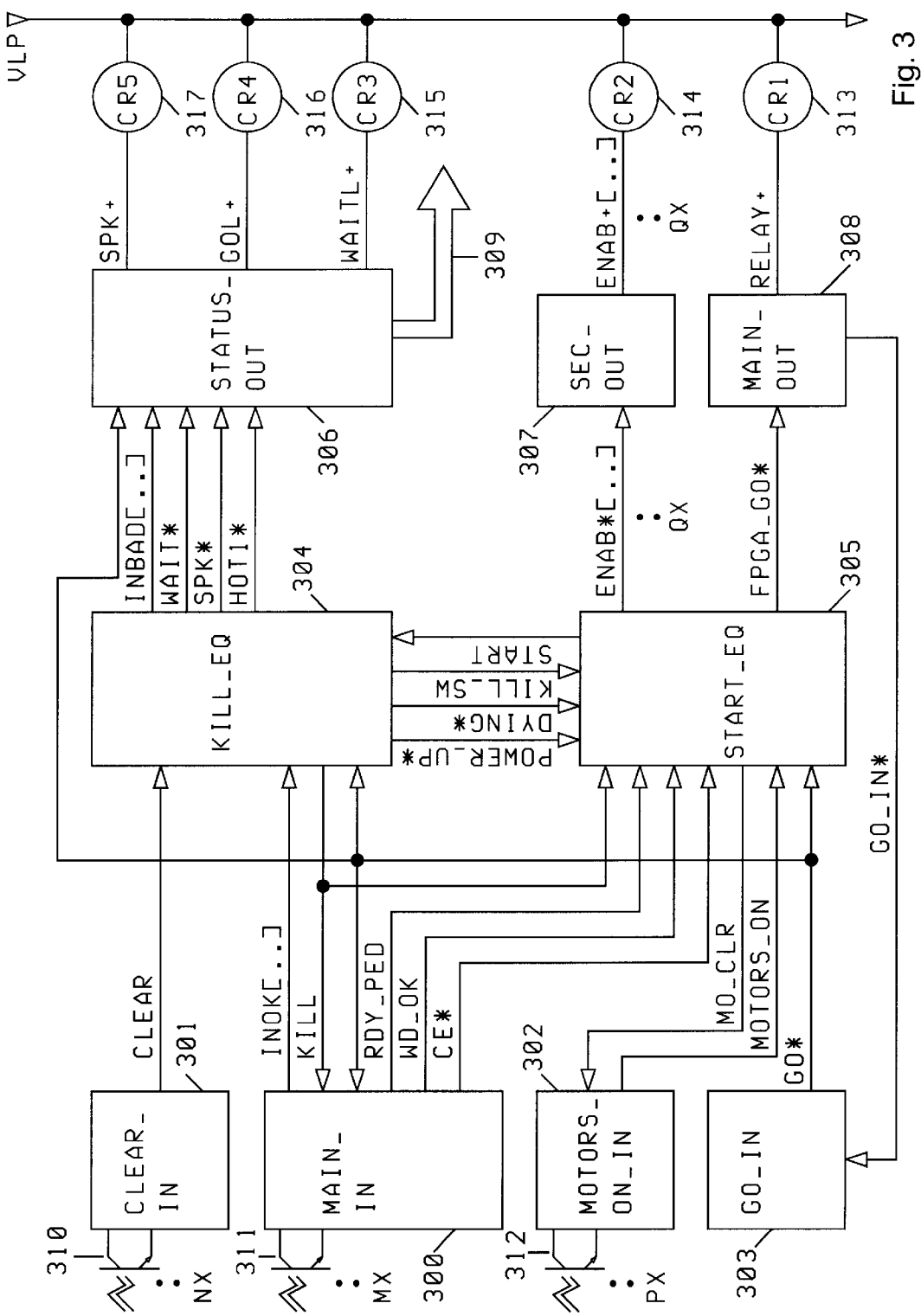
FIG. 3 illustrates a top-level schematic for the internal logic of the emergency-stop circuit of the present invention.

FIG. 3 illustrates an overview of the internals of the circuit that illustrates the main sections of the emergency stop circuit MAIN_IN 300, CLEAR_IN 301, MOTORS_ON_IN 302, GO_IN 303, KILL_EQ 304, START_EQ 305, STATUS_OUT 306, SEC_OUT 307, and MAIN_OUT 308. This figure serves as an introduction to the more encompassing FIG. 4 that provides the top-level schematic for the FPGA digital logic. As such, input and secondary output signals have been generalized with respect to what was shown in FIG. 1. In other words, what is described here is the internals of a generalized version of the emergency-stop circuit 100 shown in FIG. 1. Finally, implicitly added to FIG. 3 are the configuration means and the other output status signals 309 (e.g. CGO*, CWAIT*, and CERR[. . . ]).

Inputs to the circuit are the kill and test inputs 311 (quantity M in total), clear inputs 310 (quantity N), and motors-on inputs 312 (quantity P). Outputs to the circuit are the AC motor power relay coil driver signals RELAY+/− that drives the coil CR1 313, and the enable signals ENAB+/–[. . . ] (quantity Q), each of which drives a dedicated secondary output coil CR2 314. Additional outputs are the WAITING state indicator (WAITL+/–) which drives the coil CR3 315, the ENERGIZED state indicator (GOL+/–), which drives the coil CR4 316, and the speaker signal SPK+/–, which drives the coil CR5 317. Note that signals such as SPK+/– are isolated versions of their local counterparts such as SPK*, and that FIG. 3 illustrates only the positive end of the signal (e.g. SPK+) with the negative end being implicitly grounded in the example.

FIG. 3 also illustrates a number of internal signals, the most pertinent of which are the KILL, WAIT*, START, FPGA_GO*, POWER_UP*, DYING*, and SPK* signals because of the roles they play in determining the state of the circuit. The descriptions for these signals are provided in Table 5 together with descriptions for the remaining internal signals shown in the figure.

TABLE 5

Internal signals

| Signal Name | Description |
| --- | --- |
| CLEAR | This signal generated by CLEAR_IN is a composite clear signal that is sent to KILL_EQ in order to latch a new error and activate HOT1* to clear the power-up/reset code. |
| INOK [. . .] | This is a vector of health signals generated by MAIN_IN and sent to KILL EQ. |
| KILL | This signal generated by KILL_EQ is active during the KILLED and DYING states. It is sent to START_EQ to deactivate FPGA_GO* and to MAIN_IN to activate the INOK signals for inputs configured to be falling-types. |
| RDY_PED | This signal generated by MAIN_IN is a one clock period pulse signifying that the Type R input has had the appropriate number of inactive-to-active transitions. |
| WD_OK | This signal generated by MAIN_IN is active when the computer watchdog is active or programmed to IGNORE. |
| CE* | This signal generated by MAIN_IN is active when the Type CE (or CETO) kill input is active. |
| MO_CLR | This signal generated by START_EQ tells MOTORS_ON_IN whether startup is currently inhibited. |
| MO-TORS_ON | This signal generated by MOTORS_ON_IN is a one clock period pulse instructing START_EQ that a valid motors-on signal has been detected. |
| GO* | This signal generated by GO_IN is active whenever MAIN_OUT has activated the primary output RELAY+/–, and GO* is sent to the following places: MAIN_IN so that Types ATO, CETO, and ACTO inputs can begin timeout counting, START_EQ to disable the START signal, KILL_EQ to replace the falling START signal, and STATUS_OUT for driving status signals. |
| GO_IN* | This signal is raw feedback from MAIN_OUT that goes to GO_IN for filtering. It is active based on FPGA_GO* and the redundancy contained within MAIN_OUT. |
| INBAD [. . .] | This is a vector of latched, inverted versions of INOK[. . .]. |
| WAIT* | This signal is a buffered equivalent to KILL that is used to provide status of the circuit. |
| SPK* | This signal generated by KILL_EQ is active during the DYING state and the initial part of the ENERGIZED state, and it is sent to STATUS_OUT in order to generate an audible sound. |
| HOT1* | This signal generated by KILL_EQ is continuously active following first motors-on or following the activation of the CLEAR signal. |
| POWER_UP* | This signal generated by KILL_EQ is active during the POWER_UP state, and it is sent to START_EQ in order to inhibit energizing whenever logic power has just been applied to the circuit. |
| DYING* | This signal generated by KILL_EQ is active during the DYING state, and it is sent to START_EQ in order to inhibit energizing whenever the circuit has just been killed. |
| KILL_SW | This signal, generated by KILL_EQ from INOK[. . .], is active during the KILLED and DYING states. |

TABLE 5-continued

Internal signals

| Signal Name | Description |
| --- | --- |
| START | This signal, generated by START_EQ and sent to KILL_EQ, is active during the WAITING period. |
| ENAB* [. . .] | Secondary outputs generated by START_EQ are active based on programmed mode and CE*, GO* signals. |
| FPGA_GO* | This signal generated by START_EQ is active during the ENERGIZED state, and it is sent to MAIN_OUT which energizes the AC motor power relay coil driver (RELAY+/–). |

Now, the MAIN_IN 300 section is responsible for generating the vector of health signals INOK[. . . ] from the kill and test inputs based on the states of KILL and GO* as well as internal programming. Also included as a component of INOK[. . . ] is an internal signal that validates the health of the circuit, and this together with the external kill and test inputs provides the complete vector INOK[. . . ]. While generating the INOK bus, the section also generates the RDY_PED, CE*, and WD_OK signals. Note that this section is passive with respect to controlling the state of the circuit (e.g. KILLED, WAITING, etc). This section requires the following programming steps:

a) setting up an input type (e.g. Type A, Type R) for each kill and test input 311, associating each test input with at least one kill input.

b) setting the main clock signal;

c) setting up digital filters, timeout parameters, and related clocks; and d) setting up the configuration of each kill and test input (e.g. USE, IGNORE, or FALL).

The vector of health signals INOK[. . . ] is uniquely determined based on the above programming, the functionality of the particular input types, the kill and test input 311 signals, and the KILL and GO* signals. Specifically, the KILL signal goes to Type A, ATO, CE, CETO, AC, and ACTO inputs so that a given input can temporarily deliver an active health signal whenever it is configured to be a falling-type. Additionally, the GO* signal goes to Type ATO, CETO, and ACTO inputs so that these inputs can begin timeout counting after the signal becomes active.

Peripheral functions for the MAIN_IN section include generating a RDY_PED signal, which a one main clock period pulse delivered in response to the appropriate filtered transitions of the Type R input signal. Alternatively, the RDY_PED is continuously high if the Type R input is absent or ignored. Also, the section generates the CE* signal which is active only when the Type CE (or CETO) input is present and active. Finally, the WD_OK signal is generated by the section to be active whenever the computer watchdog is absent, ignored, or used and properly strobing.

The CLEAR_IN 301 section is responsible for generating the composite CLEAR signal based on the input signals 310 as well as internal programming. Programming this section amounts to setting the main clock signal and digital filter parameters. Similar to the MAIN_IN section, this section does not actively change the state of the circuit. Functionally, the section delivers a filtered, composite CLEAR signal whenever any of the input signals 310 becomes active.

The MOTORS_ON_IN 302 section is responsible for generating a MOTORS_ON pulse based on the input signals 312, the inhibit signal MO_CLR, and internal programming. Programming the section amounts to a) setting up an input type (e.g. Type MO or Type MC) for each input source 312, b) setting the main clock signal, c) setting the digital filters, related clocks, and d) setting the interval that specifies how long a motors-on signal (Type MO input) must be active.

Similar to the MAIN_IN and CLEAR_IN sections, this section is also passive and does not actively affect the state of the circuit. Functionally, the section delivers a one main clock period pulse at MOTORS_ON whenever the MO_CLR signal is inactive and the filtered version of one of the motors-on (Type MO input) signals becomes active and remains active for the programmed duration. This can be inhibited whenever one or more of the Type MC monitor contact signals are inactive.

The GO_IN 303 section is responsible for generating the GO* signal based on the raw GO_IN* signal and internal programming. Programming the section amounts to setting the main clock and digital filter parameters. This section together with the START_EQ and MAIN_OUT does control whether the state is ENERGIZED.

The KILL_EQ 304 section is responsible for implementing the kill equations based on the GO*, CLEAR, and START signals as well as the vector of health INOK signals and internal programming. The kill equations comprise the logic necessary to generate the POWER_UP*, DYING*, KILL_SW, KILL, INBAD[. . . ], WAIT*, SPK*, and HOT1* signals. Programming the section amounts to setting up the main clock signal and setting up the clock and timeout parameters for three periods: startup (beginning of ENERGIZING state), DYING, and POWER_UP. This section plays the biggest role in controlling the state of the circuit, specifically controlling whether the state is POWER_UP, KILLED, DYING or WAITING. The set of values for the pertinent signals always uniquely specify the state of the circuit. This is demonstrated in Table 6.

TABLE 6

Values of pertinent internal signals and the states

| | Power up | Killed | Waiting | Energized | Dying |
| --- | --- | --- | --- | --- | --- |
| KILL | Don't care | Active | Inactive | Inactive | Active |
| WAIT* | Don't care | Inactive | Active | Active | Inactive |
| START | Inactive | Inactive | Active | Inactive | Inactive |
| FPGA_GO* (GO*) | Inactive | Inactive | Inactive | Active | Inactive |
| POWER_UP* | Active | Inactive | Inactive | Inactive | Inactive |
| DYING* | Don't care | Inactive | Inactive | Inactive | Active |
| SPK* | Don't care | Inactive | Inactive | Active, then Inactive | Active |

While implementing its logic, the KILL_EQ section performs three important functions. First, it activates the KILL_SW signal whenever any of the INOK[. . . ] health signal components goes inactive. When this happens, the INOK[. . . ] health signals are latched and inverted to create the INBAD[. . . ] vector. This second vector is cleared when the circuit is energized. Secondly, the section generates the HOT1 *, POWER_UP*, DYING*, and SPK* signals as programmable functions of time and the GO* and CLEAR signals. Finally, the KILL signal is assembled as the logical OR of the KILL_SW signal and a second signal (not shown) that is active only when GO* and START both are inactive, and consequently, this creates two sources that kill the circuit: (1) from a known source identified by INBAD[. . . ] through KILL_SW and (2) from the second signal when START is inactive and for an unknown reason, GO* has deactivated. The latter case can occur when the MAIN_OUT section has an internal failure or a redundancy related issue exists there.

The START_EQ 305 section is responsible for implementing the startup equations based on the four signals from the KILL_EQ section plus the MOTORS_ON, RDY_PED, WD_OK, CE*, and GO* signals. The startup equations comprise the logic necessary to generate the FPGA_GO*, ENAB*[. . . ], START, and MO_CLR signals. Programming the section amounts to the following steps:

a) setting the main clock signal;

b) setting up the relationship between CE* and the actual signal used on its behalf to generate the secondary output signals that are configured for USE_CE*, i.e. specifying the option for qualifying CE* to generate CE2* (signal not shown in FIG. 3);

c) setting up the configuration of each secondary output (USE_GO*, USE_CE*, or OFF).

A comprehensive description for the options regarding how the CE* signal is qualified is forthcoming in the FIG. 4 description.

Functionally, the START_EQ section performs four important tasks. First, it generates the aforementioned CE2* signal. Secondly, it generates the vector of ENAB*[. . . ] secondary output signals based on their programming and the CE2* and GO* signals. Thirdly, it generates the FPGA_GO* signal by activating it in response to a MOTORS_ON pulse and always deactivating it in response to an active KILL signal. This function also generates the MO_CLR signal to inhibit the MOTORS_ON pulse whenever the state is either DYING or POWER_UP. Lastly, the section generates the START signal, which is active only when the state is WAITING (see above for transitioning into the WAITING state).

Now, pending compatible inputs, the START_EQ section initiates the transfer to the ENERGIZED state by asserting FPGA_GO*. The MAIN_OUT section with its redundancy follows suit to assert RELAY+/- (AC motor power relay coil driver), which activates the raw feedback GO_IN* signal. Finally, the GO_IN section plays its role (see above) and activates GO*, and in the START_EQ section deactivates START. Recall that the second source that generates KILL in the KILL_EQ section comes from both START and GO* being inactive. The fact that START deactivates after GO* becomes active keeps that second source from normally being an issue.

The STATUS_OUT 306 section performs basic isolation functions that do not warrant explanation here but also performs an important function that generates error codes based on the INBAD[. . . ] and HOT1*. This is the section that prioritizes the components in INBAD[. . . ] and sets the corresponding error code in the ERR[. . . ] vector, e.g. 309. This is the case unless HOT1* is not active (before first-motors-on), which supersedes the INBAD[. . . ] generated error code with the dedicated power-up/reset error code.

The SEC_OUT 307 and MAIN_OUT 308 sections each possess straightforward functionality essentially isolating and/or transforming their respective inputs into their respective outputs. They do not require programming and do not warrant further description here.

Figure 4B:
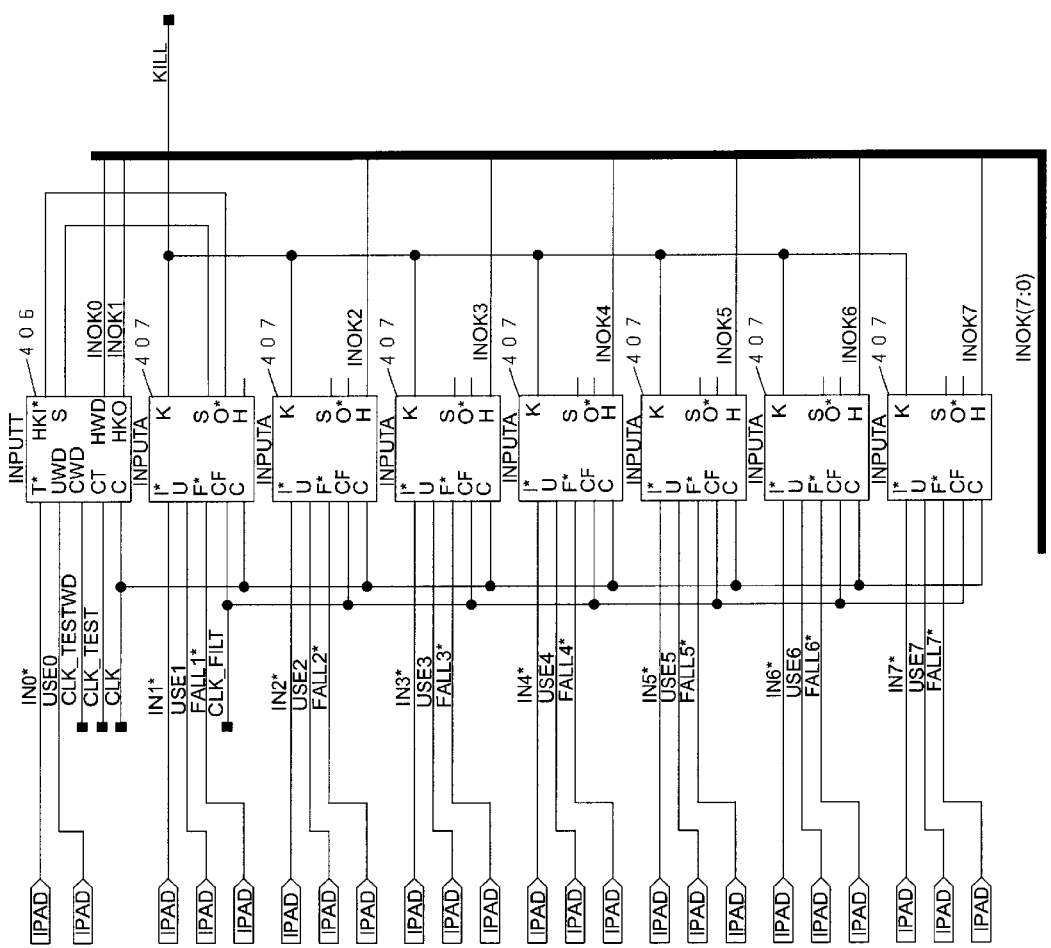

FIGS. 4A–4I illustrate the detailed schematic for the actual logic used within the FPGA in the preferred design. This logic specifies exactly how the input signals to the FPGA are used in order to establish what the states of the output signals will be. Note that as shown in FIG. 4A, the input signals to the FPGA are illustrated with input pads 400, and the output signals from the FPGA are illustrated with output pads 401.

Relative to FIG. 3, the logic within the FPGA chip has been partitioned into additional subsections, e.g. MAIN_IN 300 is made up of such subsections as INPUTT 406, INPUTA 407, INPUTB 410 in FIG. 4. Also, relative to FIG. 3, the FPGA digital logic implements the main sections shown in FIG. 3 as MAIN_IN 300, CLEAR_IN 301, MOTORS_ON_IN 302, GO_IN 303, KILL_EQ 304, START_EQ 305, and part of STATUS_OUT 306. The locations of these sections in FIG. 4 will be called out here in the ensuing description. Following this, the individual subsections 406, 407 will be described in detail.

FIG. 4A illustrates how clocks used throughout the circuit are programmed. The internal subsection CLKDV 402 is shown and exists for the purposes of dividing by multiples of two the incoming clock CLK into a number of lower frequency clocks. This subsection uses standard clock divisor techniques to generate additional clocks that range in frequency from CLK/128 to CLK/16384. The programming of DEBOUNCE, DELAY-RISE digital filters, and various counters involves the association of dedicated clock signals with the desired lower frequency clock (e.g. computer watchdog timer clock CLK_WD is assigned to CLK/16384 and AC Line Sense clock CLK_AC is assigned to CLK/128). Note that here in this example CLK is 2 MHz.

Also shown in FIG. 4A, clock signals that are driven by the BUFG 403 symbol are global clocks, e.g. CLK and CLK_FILT, which is meaningful in the design because it helps in routing the FPGA. This means that these clocks (and their inverses) are readily available throughout the design process to clock any internal flip-flop. On the other hand, signals that are buffered by the BUF 404 symbol are done so in order to essentially assign different net names to the same signal, if that is desired. For example, in FIG. 4A, CLK_WD and CLK_DIE have both been assigned to the CLKDV output signal CLK/16384. Hence, in the event that they are reprogrammed, this preserves continuity elsewhere wherever the clocks are used. A final buffer is the OBUF 405, which is used here to send the CLK_CHECK signal off chip in order to validate the functioning of the oscillator (and this comes back as the local kill input OKCLK).

FIGS. 4B and 4C illustrate the MAIN_IN section, which for the FPGA design example contains 1 Type-T, 7 Type-A, 1 Type-CE, 1 Type-R, 2 Type-B, 1 Type-WD, 1 Type-AC, and 2 Type-ES input sections, which are exemplified by 406, 407, . . . , 413. The input subsection that checks circuit health is exemplified by the INPUTCK subsection 414. The figures illustrate how the test input IN0* and the kill inputs IN1*, . . . , 1N7*, CENAB*, READY*, P15*, N15*, WDIN*, ACIN*, ESTOPI*, ESTOPE*, OKVCC*, and OKCLK are distributed to the INPUTT, INPUTA, NPUTR,. INPUTB, INPUTWD, INPUTAC, INPUTES, and INPUTCK subsections. Note that the test input IN0* associated with the Type-A kill input IN1*.

The primary function of each of these subsections is to generate an "IN_OK" signal that provides an active high health status which is generated from the configuration signals and states of the corresponding inputted signals. This is true except for the INPUTT subsection, which generates its own health signal (INOK0) and it generates the health signal (INOK1) for the associated INPUTA subsection just below. Additional inputs to the sections are the programming pins USE0, . . . , USE7, USECE, USERDY, USEP15, USEN15, USEWD, USEAC, FALL1*, . . . , FALL7*, and FALLCE*, which establish how the individual subsections are to function. Another additional input into many of these subsections is KILL, which is used as a temporary inhibit by falling-type inputs. Finally, based on programming (see above), the generated clocks CLK, CLK_FILT, CLK_AC, CLK_TEST, CLK_TESTWD, and CLK_WD are inputs to the subsections.

Now, sixteen outputs from these internal input subsections form a fifteen-bit bus, INOK[14:0], which is used as a basis for the kill equations (KILLEQ section). Other outputs from these sections are the RDY_PED signal from the INPUTR subsection, the CE* signal from the Computer Enable subsection, WD_OK, the LED drive signals (WDLED*, ACLED*), and the INBAD14 signal that is the inverted INOK14 signal.

The INPUTB subsection 410 generates a health signal H for a Type-B kill input I*. It outputs an active "sensitive" signal S whenever the kill input is programmed for USE (input U is active). It outputs an active health signal H whenever U is inactive or the kill input I* is active.

The INPUTA subsection 407 is more involved and generates a health signal H for a Type-A kill input I*. It outputs an active "sensitive" signal S whenever (i) the kill input is programmed for USE or alternatively (ii) programmed for FALL and the circuit is energized and the kill input I* has activated. These two cases equate to (i) input U being active and F* being inactive or (ii) inputs U and F* both active, KILL input 'K' is inactive, and I* has activated. The CF input is a slower clock that helps filter out bounces whenever I* activates. The O* output is a filtered I*. It outputs an active health signal H whenever S is inactive or the kill input I* is active.

The NPUTR subsection 409 is similar to the INPUTB, but it includes logic for sensing a inactive-to-active edge on the input signal I*, which is output as a positive one clock pulse RDY_PED when U is active. (Note that the first pass through after powering of logic requires three edges.) RDY_PED is active always, when U is inactive.

The INPUTWD subsection 411 is similar to the INPUTB subsection but the active health signal requires the kill input W* to toggle faster than a frequency of CLK_WD/256 (about 2 Hz, here), where CLK_WD is CF in the subsection. The CLR input pulse is used to assert the health signal and synchronize the start of the counter function to (a few clocks after) an external event. Note that FIG. 4C buffers the outputted health signal INOK11 to be WD_OK, which is used elsewhere in the logic.

The IPUTAC subsection 412 is very similar to the INPUTWD subsection, except for the state of the kill input A* matters. The value (high or low) of the input signal A* is relevant here, whereas the value of the signal W* in the INPUTWD subsection was not relevant. Valid AC power is sensed whenever the incoming A* signal is active (low). However, an inactive A* by itself is not indicative of a failure in sensed AC power. For example, this is because the origin of the A* signal comes from an HCPL3700 optical isolator that may be experiencing a normal zero crossover period which is a period when the instantaneous value of the AC power is too low to generate an active A* (the LEDs of the optical isolator do not conduct, see D3 of FIG. 1). This period is brief in the AC power cycle, and so it is the function of this subsection to time the period of non-conduction in case it takes inordinately too long, which would be indicative of a genuine AC power failure. So, the interval that is timed starts when A* goes from active-to-inactive and ends when A* goes back active. To maintain an active health signal H, that interval must be less than 256/CLK_AC (about 16 ms in this example). Note that (i) the KILL signal (K) clears a fault (overrun interval) in the subsection and (ii) the subsection does not begin counting unless A* has been active, which filters out crossover issues that occur at startup.

The INPUTES 413 and INPUTCK 414 subsections are straightforward and generate active high health signals H whenever the emergency-stop buttons are active and there are no internal errors (e.g. clock is ok).

The INPUTT subsection 406 contains the testing logic and receives the input signal (HKI*) from the O* signal of the INPUTA below and generates a validated health signal (HKO). The input signal T* is used to initiate a test cycle of the Type-A input subsection Oust below in FIG. 4) and its sensor channel. The test once initiated must see HKI* cycle within a programmable interval, which is 256/CLK_TEST (about 0.5 seconds in this example).

The INPUTT subsection also itself can be a kill input, specifically a Type-WD, since it possesses an embedded INPUTWD internally, which is enabled by the UWD input signal and utilizes the input signal CWD for the interval timer (CLK_TESTWD in FIG. 4). This requires that the next test start within 256/CLK_TESTWD seconds of the end of the previous test (about 2 seconds in this example). This ensures that T* cycles frequently enough (tests of the Type-A are conducted often enough).

The validated health signal HKO also depends on whether the INPUTA subsection is "sensitive", which is known by signal S. If it is not sensitive (S inactive), then both HKO and HWD are driven active. If sensitive (S active), then HKO requires a successful test (an HKI* cycle) whenever T* becomes active within a programmable interval (256/CLK_TEST). During a test, HKO is driven active, while INPUTT waits for HKI* to cycle. Failed tests do require HKI* (and hence IN1*) to cycle sometime later in order to clear the test fault. After a successful test, HKI* is used to generate HKO so that an inactive IN1* during a non-testing period is able to kill the circuit.

Note that the timing requirements specified by CLK_TEST and CLK_TESTWD should be tailored to a specific application, just as CLK_WD and CLK_AC are.

FIG. 4D illustrates the MOTORS_ON_IN, GO_IN, and a portion of the START_EQ sections. Motors-on button signals MOE* and MOI* and go signal GO_IN* are routed to additional internal subsections, which are INPUTMO 415 and INPUTGO 416, respectively. The primary function of the INPUTMO section is to monitor the two motors-on signals MOE* and MOI* and generate a MOTORS_ON pulse in response to the pressing of one of the buttons. Note that the design demonstrates two motors-on signals (Type MO inputs) selected from the input sources and does not explicitly demonstrate a monitor contact signal (Type MC input) being used, but this addition will be discussed in the INPUTMO subsection description. The primary function of the INPUTGO section is to monitor the incoming GO_IN* signal and generate a filtered, local, internal version, GO*.

The INPUTGO subsection 416 shown in FIGS. 4D (and 4H) employs straightforward filtering similar to that discussed in other sections. For the input I*, It simply generates a filtered output G* and its inverse G.

The INPUTMO subsection 415 monitors the incoming motors-on button signals M1* and M2* and clear (inhibit) signal CLR and generates a one C clock period pulse P needed in order to start the emergency-stop circuit. The CLR signal, which inhibits P from pulsing, is driven in FIG. 4 by MO_CLR which is active in the DYING or POWER_UP states. This section also ensures that a motors-on input signal has a proper transition (inactive-to-active) and is active for at least the desired interval 256/CLK_MO (about 0.5 sec, here).

Straightforward changes may be made to incorporate additional functionality such as using a monitor contact (a Type MC input) and to provide programmability for it. If used, a monitor contact must be active before the output pulse of the INPUTMO subsection can be generated. This can be done in a manner similar to that shown for the other subsections possessing programmability. For example, a Type MC input signal (e.g. MC*) could be filtered, inverted and using an OR2B1 gate could be combined with an associated programming signal (USEMC) to create an internal signal that when inactive would inhibit the pulse of the INPUTMO subsection. Additional programmability may also be incorporated within the design to provide a choice as to whether the inactive-to-active transition on the motors-on signal is required, and when not required, the motors-on signal could be tied active to emulate an automatic re-energizing function.

FIG. 4D also shows that the primary output FPGA_GO* signal is generated from the buffered, inverted output of a flip-flop with clock enable, FDCE 417. The clock enable of the flip-flop is the MOTORS_ON signal, and this signal may be inhibited by the MO_CLR signal (the CLR input to the INPUTMO subsection), which is provided by the NAND2 gate 421 whenever either POWER_UP* or DYING* is active.

When the KILL signal is inactive, the enabling of the clock by the MOTORS_ON signal asserts the output of the FDCE 417, thereby asserting the output signal FPGA_GO*. Activation of the KILL signal, on the other hand, clears (de-asserts) the output of the flip-flop, thereby de-asserting the output signal FPGA_GO*. Descriptions for the generation of the KILL, POWER_UP*, and DYING* signals are forthcoming.

FIG. 4D also shows that an internal START signal is generated from filtered versions of the GO_IN* input signal subject to logic equations formed from other internal control signals. Specifically, the filtered versions, GO and its inverse GO*, are used as the clear and data inputs of the FDCE 418. An active GO signal simply clears the FDCE, thereby de-asserting its output and the output of the AND4B1 419, which in turn de-asserts the START signal. Note that the AND4B1 gate is an AND gate with four inputs, the lower input of which is inverted as shown in the figure by the bubble on the gate. (Hence, the "B 1" is appended to the "AND4", which demonstrates an example of standard gate naming practice employed by the Xilinx component library.)

On the other hand, an inactive GO signal permits an inactive GO* signal (high) to be clocked through the FDCE whenever a RDY_PED clock enable pulse is present. The RDY_PED signal is a pulse of one clock period that is generated by the INPUTR subsection shown in FIG. 4C. (Note that a "PED" suffix denotes "positive-edge detected", and a "NED" suffix denotes "negative-edge detected." In general, either of the edges is conveniently found using two flip-flops and an AND2B1 gate.) Additional signals POWER_UP*, DYING*, and KILL_SW are inputs to the AND4B1, which is used with the FD 420 to generate START signal. The conditions that must exist in order for START to be active are given by the following:

a) GO (and hence GO*) is inactive;
b) RDY_PED is active for at least one CLK period so that the inactive (high) GO* signal is clocked through the FDCE;
c) POWER_UP* is inactive;
d) DYING* is inactive;
e) KILL_SW is inactive; and
f) The active output of the AND4B1 is clocked through the FD flip-flop.

Descriptions regarding the use of the START and the generation of KILL_SW signals are forthcoming.

Finally, regarding FIG. 4D, it is important to recall that the output signal FPGA_GO* amounts to one condition required to energize the emergency-stop circuit. Additional conditions, embedded within redundant circuitry external to the FPGA (e.g. MAIN_OUT), combine with it to energize the circuit, the status of which is fed back to the FPGA at input pin GO_IN* . (Refer to FIG. 3.)

FIG. 4E illustrates a remaining portion of the START_EQ section. This is the circuit that generates the CE2* signal, which is the actual signal sent to the ENABLE secondary output sections (shown in FIG. 4F). The CE2* signal is the CE* signal that has been validated by a desired means that depends on the application at hand. The circuit can be programmed to disable CE2* whenever the computer watchdog is not healthy or whenever the state is not ENERGIZED or DYING. The selection of these two restrictions is made by programming the two pins CE_USE_WD and CE_USE_ST.

The signal 422 to the inverting input of the OR2B1 gate 423 controls whether CE* is passed on to CE2*. Whenever the signal is low, the output of the OR2B1 gate is high, which means that CE2* is disabled regardless of CE*. On the other hand, whenever the signal is high, the output of the OR2B1 gate is equal to CE*. Therefore, description of this part of the circuit will involve what makes the 422 signal high to pass CE* on to CE2* or low to disable CE2*.

The 422 signal is the output of the AND2 gate 424, which means that CE* is passed only when both outputs of the OR2B1 gates 425, 426 are high. The simplest case for this is when both CE_USE_WD and CE_USE_ST are inactive (low), because these signals propagate in an exclusive way through the inverted inputs of their respective OR2B1 gates to activate the corresponding outputs. As such, the remainder here is therefore devoted to the individual cases of where the two programming inputs are active.

First, consider that CE_USE_WD is active, which propagates through the IFD flip-flop 427 as active. This permits the WD_OK signal to be passed on to the upper input of the AND2 gate 424. The WD_OK signal and hence the output of the upper OR2B1 gate 425 is active only when the computer watchdog is active or configured for IGNORE. The motivation here is that while CE* may be active, the computer may have ceased functioning. In this case, the computer watchdog signal will cease to strobe, which will lead to the WD_OK signal becoming inactive. Note that the design accommodates the case where the computer watchdog is not used (set to IGNORE), which means that the WD_OK signals is continuously high (see INPUTWD subsection) thereby effectively removing the restriction placed by CE_USE_WD.

Secondly, consider that CE_USE_ST is active, which propagates through the IFD 427 as active. This permits the output of the FDCE flip-flop 428 to propagate to the lower input of the AND2 gate 424. Now, the output of the FDCE flip-flop is active and hence the output of the lower OR2B1 gate 426 is active only when the state of the circuit is either ENERGIZED or DYING. This is accomplished by using the NAND2 gate 429 as the data input for the FDCE 428, where the NAND2 output is high when either DYING* or GO* is active. The data input is subject to the state of the circuit not being POWER_UP, because the clear input to the 428 flip-flop is controlled by the inverted POWER UP* signal. The motivation for this branch is twofold: (1) to specify the states when CE* has an effect, and (2) to provide the ability to place an upper limit on how long the power-loss period could last and hence, the reactionary period for devices programmed for USE_CE.

FIG. 4F illustrates the final portion of the START_EQ main section, which is the four enable sections that output the ENAB0*, . . . , and ENAB3* signals based upon the input configuration signals USEGO0*, USECE0*, . . . USEGO3*, and USECE3*. The ENABLE 430 sections use these inputs together with the GO*, CE2*, and CLK clock signals to generate the appropriate ENAB0*, . . . ENAB3* signals that control the secondary outputs of the circuit.

The ENABLE subsection 430 utilizes a multiplexor and the input configuration signals UG* and UC* to decide whether the input signals GO*, CE*, or neither controls the output ENAB*. (Note that CE* in the subsection is CE2* in FIG. 4.) If UG* is active, then ENAB* is GO*. If UC* is active, then ENAB* is CE2*. If both are active, then ENAB* is GO*. If both are inactive, then ENAB* is inactive.

Figure 4H:
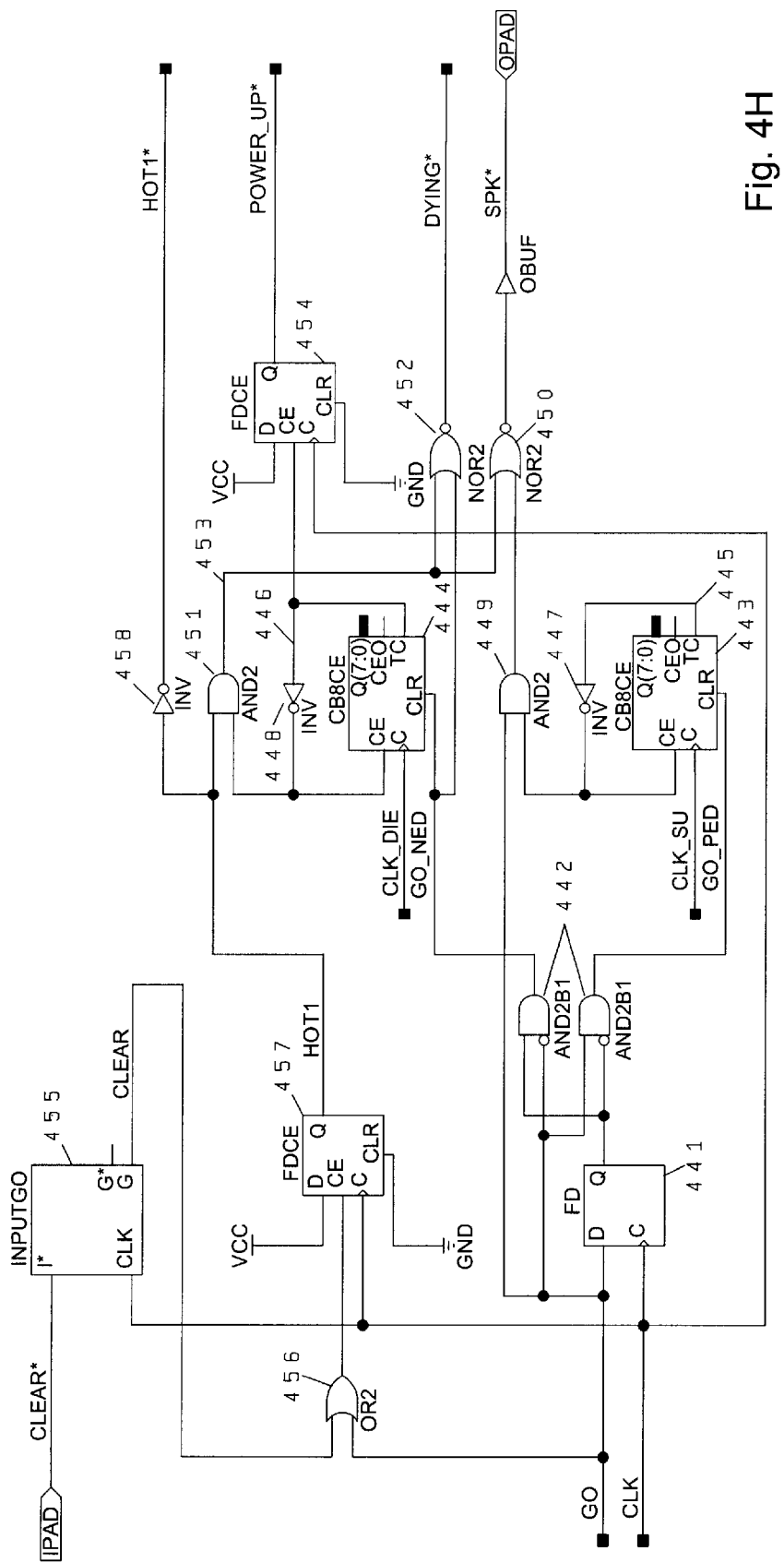

FIG. 4G illustrates a portion of the KILL_EQ main section, which is the logic required to generate the KILL, WAIT*, and INBAD[. . . ] signals. At the far left, fourteen of the fifteen INOK signals are inputs to two AND7 gates 431, which drive the inputs of a NAND2 gate 432. The output of the NAND2 gate therefore is an active high signal that is indicative of the de-asserting of one or more of the INOK signals. This signal is then fed into a positive-edge detection circuit consisting of two FD flip-flops 433, 434, and an AND2B1 gate 435. The output of the positive-edge detection is the KILL_SW_PED signal, which is combined with CLEAR via an OR2 gate 436 in order to provide a clock enable signal necessary to latch the state of the INOK signals. The latching is accomplished by a fourteen-bit settable flip-flop FD14SE* 437, which inverts at output the signals to create fourteen bits of the fifteen-bit bus INBAD [14:0]. The FD14SE* circuit possesses a set input, GO_PED, which sets all of the flip-flops, thereby clearing the inverted outputs, INBAD[13:0]. (The GO_PED signal is shown in FIG. 4H.) The output of the first flip-flop 433 of the positive-edge detection circuit is combined with the fifteenth, non-latched bit INBAD14 using the OR2 gate 438 in order to create the KILL_SW signal. This signal when asserted indicates that at least one of the input subsections in MAIN_IN has an inactive INOK bit. The START and GO signals are combined using a NOR2 gate 439 to create a signal that is high whenever neither START nor GO is active. The output of the NOR2 gate combines with KILL_SW using an OR2 gate 440 in order to create the KILL signal, which is then buffered to create the WAIT* signal.

From the figure, it is clear that the KILL and WAIT* signals are not active at the same time since they are equivalent (buffered) and of opposite polarity. Furthermore, due to the circuitry, the KILL signal is de-asserted and the WAIT* is asserted if and only if all of the input subsections output active INOK signals and either the START or GO signal is active. Finally, note that the KILL signal is used in other portions of the logic to clear FDCE flip-flop 417 so that FPGA_GO* gets de-asserted, and it is used so that falling-type inputs (e.g. INPUTA 407) are reset in preparation for startup.

FIG. 4H illustrates the CLEAR_IN section and the remaining logic of the KILL_EQ section that is used to create the CLEAR, HOT1*, POWER_UP*, DYING*, SPK* signals. The signals GO_PED and GO_NED are generated here, which are the one CLK clock period pulses that signal the rising and falling edges of the GO signal, respectively. These signals are generated using the output flip-flop of the INPUTGO 416 subsection, the FD 441, and the AND2B1 gates 442. The GO_PED and GO_NED signals are used to clear two eight-bit counters 443, 444, the first of which is used as a timer that runs when the circuit is energized and the second of which is used as a timer that runs when the circuit is killed. Both timers are configured to run until they reach the terminal count of 255, at which time the active high terminal count signals 445, 446 use the inverters 447, 448 to disable the clocks CLK_SU, CLK_DIE from counting further. Therefore the GO_PED, GO_NED signals initiate the counting by clearing the terminal count signals, which in turn re-enables counting, starting from zero. Programming the interval for the DYING state amounts to programming the CLK_DIE signal at the CLKDV 402 output or alternatively, selecting the number of bits for the counter. Finer resolution can be obtained by additional logic that halts the count a value other than 255.

The scenario of counting proceeds as follows. An inactive GO signal becomes active, which generates a GO_PED pulse that clears the eight-bit counter 443. The counter begins counting, and during this period, the terminal count signal is inactive but its inverse is high, which is combined with the GO signal at the AND2 gate 449 to create an active high speaker signal that proceeds to the NOR2 gate 450. This gate is a NOR gate to accommodate the active low speaker signal SPK*. The speaker signal therefore is active while the counter counts, and this based on the programmed clock CLK_SU provides a 2048*256/CLK duration chirp at energize time, which equates to approximately a ¼ second period for a 2 MHz CLK signal. This portion of the circuit basically remains dormant until such time as the GO signal becomes inactive, which generates a GO_NED pulse that clears the eight-bit counter 444. This counter begins counting, and during this period, the terminal count signal is inactive but its inverse is high, which is combined with the HOT1 signal at the AND2 gate 451 to create an active high speaker signal that proceeds to the NOR2 gate 450. The second control into the NOR2 gate works in a way similar to the first, emitting a longer chirp in this case in response to the killing of the circuit. The duration of the kill sound is 16384*256/CLK, which is about a 2 second sound for a 2 MHZ CLK signal.

A second responsibility for this portion of the logic is to generate the DYING* signal, which is used to prevent the immediate restarting of a freshly killed circuit (see above for asserting START and MOTORS_ON). The DYING* signal is generated by using the NOR2 gate 452 to combine the GO_NED signal with the kill speaker signal 453, which provides a dependable 2 second restart inhibit for the baseline 2 MHz CLK signal that prevents START and MOTORS_ON from being asserted.

A third responsibility for this portion of the logic is to generate a POWER_UP* signal, which is used to prevent immediate energizing following a power-up/reset event and also to inhibit the first motors-on until such time as all digital filters have been initialized. This signal is low (active) whenever the logic has been configured and has just begun operation following power-up/reset. This is because all flip-flops begin operation in a reset state. Also at power-up/reset, the counter 444 begins counting from zero, since all of its internal flip-flops are also reset. (Note that the speaker signal is not asserted immediately following power-up/reset because of the HOT1 signal which is not asserted until first motors-on.) The counter proceeds until it reaches its terminal count, which occurs at approximately 2 seconds from power-up/reset when using the 2 MHZ CLK signal. The terminal signal then enables the clock on the FDCE 454, which de-asserts POWER_UP* for the remainder of the session. While asserted, the POWER_UP* prevents START and MOTORS_ON from becoming asserted (see above).

FIG. 4H also illustrates the logic used to generate the CLEAR and HOT1* signals. The CLEAR* signal comes from an input pad and is filtered by an IPUTGO 455 subsection, which provides the desired de-bounce filtering. The resulting inverted signal, CLEAR, is used as one of the sources that latch new INBAD signals at the fourteen-bit flip-flop 437 (see above), and it is also used as one of the sources that activates the HOT1* signal. The CLEAR and GO signals are inputs of an OR2 gate 456, the output of which enables the clock of the FDCE 457 flip-flop. With the clock enabled, the FDCE asserts the HOT1 signal, which since power-up/reset had been low. When active, the HOT1 signal and its inverse HOT1 *, obtained by the inverter 458, signify that the circuit has been energized at least one time (first motors-on) or that the clear button has been pressed.

Figure 4I:
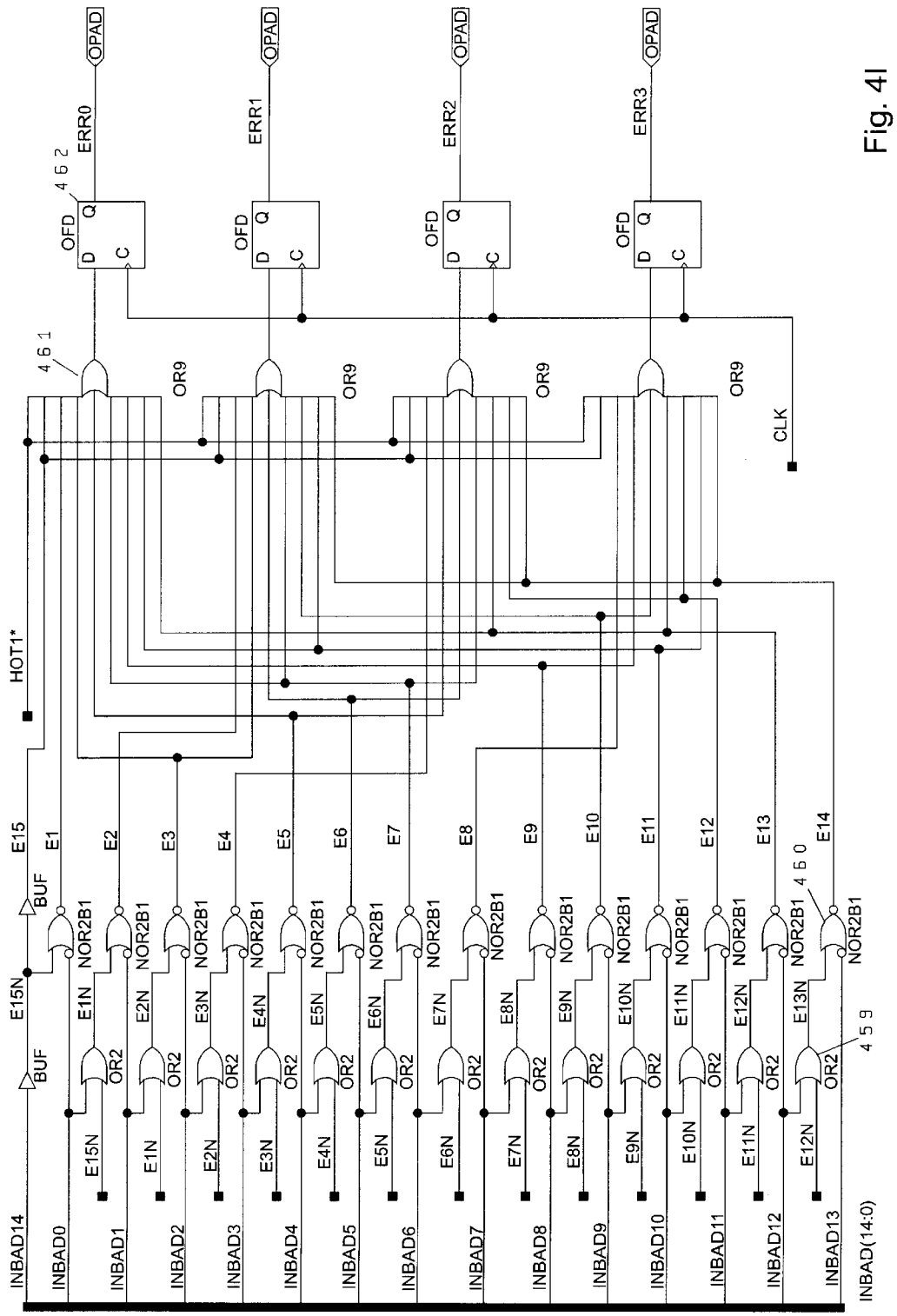

FIG. 4I illustrates a portion of the STATUS_OUT section, which is the manipulation of the fifteen-bit INBAD [14:0] bus into a fifteen-bit E[15:1] bus and subsequently into a four-bit ERR[3:0] bus. The transformation of INBAD into E is accomplished by a cascading technique that employs local signals E15N, E14N, ... E1N together with the thirteen OR2 459 and fourteen NOR2B1 460 gates. The transformation permits only one E bit to be active at a time, by prioritizing the INBAD signals with INBAD14 having highest priority, INBAD0 having second highest priority, INBAD1 having third highest priority, and so on, until INBAD13 is found to have the least priority. Given that the highest priority active signal is INBADn, the corresponding, active signal is En+1.

As an example, consider that INBAD3 and INBAD5 are both active, and that no other INBAD signal is active. From the top of the figure, it can be seen that when INBAD14 is inactive, E15 and E15N are also inactive. On the next row, since INBAD0 is also inactive, then E1 is inactive, because a high output from the NOR2B1 gate requires low and high on the upper and lower inputs, respectively. In fact, at any given NOR2B1 gate, a low signal on the upper input denotes that no higher priority signal is active, while alternatively a high signal denotes that one is. The cascading OR2 gates provide this upper signal by successively OR-ing a new INBAD signal with the previously OR-ed signal of higher priority. Therefore in the example, E3N is low, since no higher priority INBAD signal is active. Now, because INBAD3 is active, then E4 and E4N are both active. The fact that E4N is active prohibits any of the lower priority En's from being active. For example, E6 is not active, even though INBAD5 is active in the example.

The transformation of E[15:1] into ERR[3:0] is a straightforward hexadecimal conversion using the OR9 461 gates and the OFD flip-flops 462, where ERR0 is the $2^0$ digit, ERR1 is the $2^1$ digit, ERR2 is the $2^2$ digit, and ERR3 is the $2^3$ digit. In the example, E4 asserts ERR2, and the other three bits are de-asserted. A deviation from this transformation exists whenever the HOT1* is inactive (high), which denotes that first motors-on has not yet occurred. In this case, the ERR[3:0] bus asserts all four bits, which drives the power-up/reset error code of 15. In the FPGA design example, the error code of 15 performs double duty by being active when HOT1* is active and also when there is an internal fault via the INPUTCK subsection 414, but of course, these could be separated, which would require an additional ERR bit in the example.

Two of the digital filters used in the invention are the DEBOUNCE and DELAY-RISE components. They are straightforward designs that are not illustrated, but their functionality is provided here. The non-inverting DEBOUNCE circuit outputs a signal that is synchronous with CLK and changes only in response to an incoming signal that is constant for a certain number of $CLK_2$ clock periods (e.g. four). The non-inverting DELAY-RISE filter is explained in detail in the INPUTA subsection definition.

Figure 5:
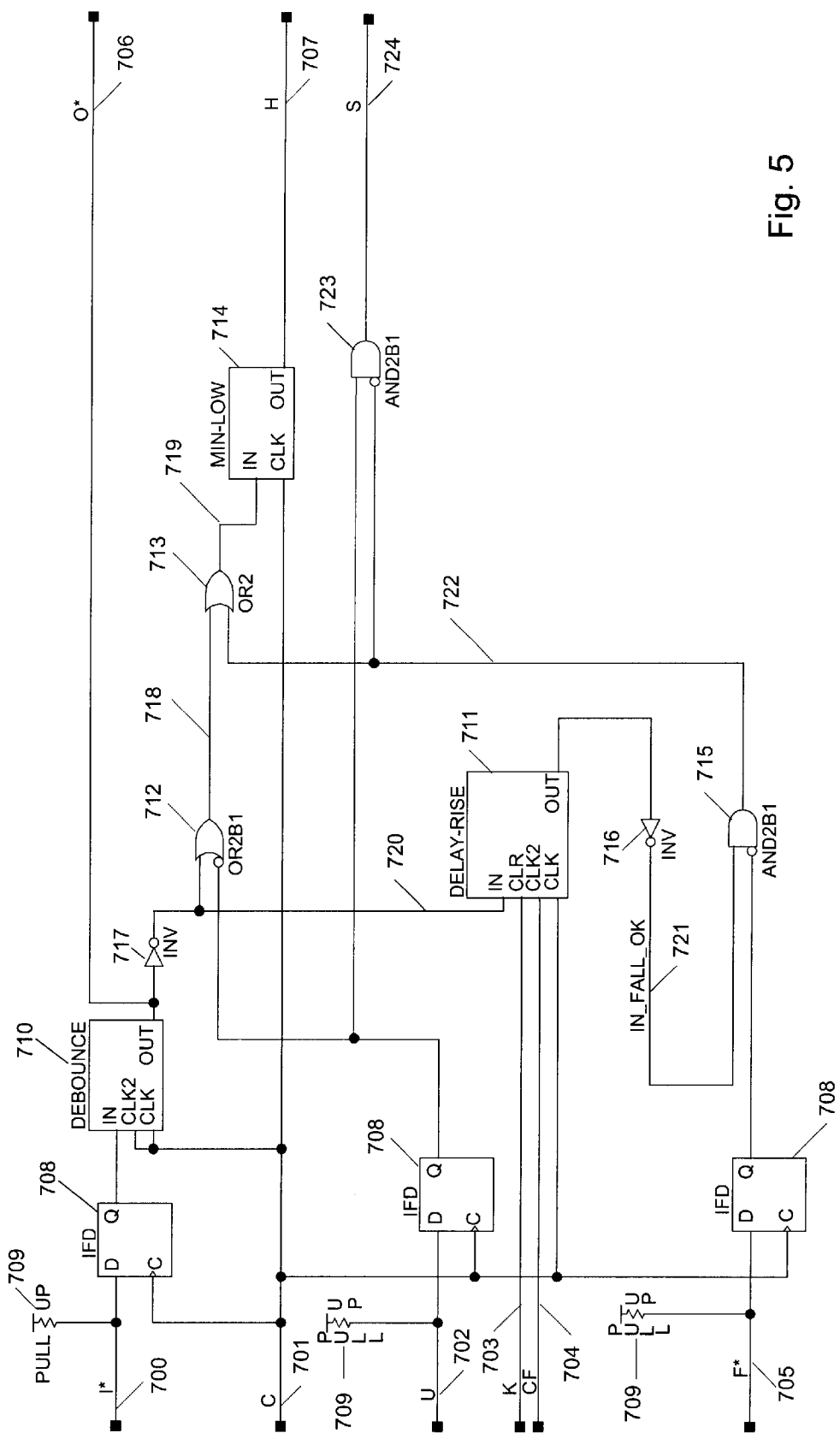
FIG. 5 illustrates the INPUTA FPGA subsection schematic of the preferred embodiment.

FIG. 5 illustrates the INPUTA subsection of the FPGA logic that is a circuit which monitors signals coming from a Type-A input in order to generate a representative health signal. Inputs to this subsection are the three input pads, I* 700, U 702, F* 705, two clock signals, C 701, CF 704, and the K 703 signal. The outputs from this subsection are the filtered O* 706 signal and the health H 707 signal. A further output is the "sensitive" signal S 724, which is active in either of these two cases: (i) U is active and F* is inactive or (ii) U and F* are both active, K is inactive, and I* has activated.

The setting for the U input determines the functionality of the INPUTA subsection. The inverting input of the OR2B1 gate 712 comes from the U 702 signal that is synchronized by IFD 708 and also is connected to a redundant, internal pull-up resistor 709. It is important to note that these internal resistors shown throughout the design are redundant, because in this example, an additional pull-up resistor resides within the circuit but external to the FPGA chip. The signals internal to the FPGA are pulled up in such a way as to kill the circuit should for some reason an incoming signal be lost.

Whenever the U input is configured to IGNORE, the synchronized, inactive U signal propagates to make the output 718 of the OR2B1 gate high, the output 719 of the OR2 gate 713 high, and finally the output of the MIN-LOW 714 high, which is the H 707 health signal. In this way, the health signal remains active as long as the U signal is inactive, regardless of the state of the other inputs. Otherwise, when the U input is active (configured for USE or FALL), it does not contribute to an active high health signal, which means that the source of the active H signal must come from the other inputs. In this regard, the remainder here is devoted to the case when U is active in order to specify how H is otherwise determined.

The I* signal is connected to a redundant pull-up resistor 709 and is clocked at the input pad by an input flip-flop IFD 708 in order to make the signal synchronous with the local clock. The registered signal then proceeds to a DEBOUNCE circuit 710 for filtering, which outputs the active-low output signal O* 706. This signal is also inverted 717 to provide an active high signal 720, which proceeds to two places in order to determine health: (1) the non-inverting input of the OR2B1 gate 712, and (2) a DELAY-RISE 711 circuit. For the first case, an active signal 720 propagates through the OR2B1 the make the output 718 high, through the OR2 gate 713 to make the output 719 high, and finally through the MIN-LOW filter 714 to make the H health signal high. In this way, the health signal remains active when the I* signal is active, regardless of the state of K, CF, and F*.

A second configuration signal, F, 705, determines whether the DELAY-RISE branch contributes to health, whenever the I* signal is not yet active. The F* signal is likewise connected to a redundant pull-up resistor 709 and registered using the IFD 708. The registered version of the F* signal then proceeds to the AND2B1 gate 715, where it controls whether the output of the DELAY-RISE proceeds to the OR2 gate 713. When the F* signal is active, the AND2B1 gate sends the IN__FALL__OK 721 signal through to the OR2 gate 713 enabling the DELAY-RISE branch, and when it is inactive, output 722 of the AND2B1 gate is forced low, which disables the DELAY-RISE branch.

Consider that the F* signal is active and that the IN__FALL__OK signal is generated from the inverse 716 of the output of the DELAY-RISE circuit 711. The objectives of the DELAY-RISE circuit are to (1) reset to low when the K signal is detected and (2) set to high after a two CF 704 period delay following the detection of the positive edge of the input signal 720. Because of the inverter, these objectives equate to (1) set IN__FALL__OK to high when the K signal is detected and (2) reset IN__FALL__OK to low after a two CF period delay following the detection of the positive edge of the 720 signal. Therefore, the K input (equates to KILL in FIG. 4) asserts the H signal by way of IN__FALL__OK. But this is only temporary, since the IN__FALL__OK signal will deactivate once the inactive-to-active transition of the I* signal propagates through the DEBOUNCE and DELAY-RISE circuits. Note that the H health signal remains active through a transition phase where the upper input of the OR2 gate 713 becomes active before the lower input goes inactive, thereby preserving active health signals 719, 707.

It is important to note the rationale for employing the DELAY-RISE circuit. This circuit filters out low-frequency signal bouncing that may come through the DEBOUNCE filter during the inactive-to-active transition of the I* signal. The DEBOUNCE filter on its own works well in filtering out noise that contains a high frequency content (e.g. hundreds of kHz). Lower frequency filtering is not done by the DEBOUNCE, because any inactive edge detected for the upper branch of this circuit should de-assert the H signal whether or not neighboring active edges exist due to a slowly bouncing signal. However, for the lower branch, when a toggle switch is used as a falling-type kill input, an associated I* signal may take twenty to fifty microseconds to completely make an inactive-to-active transition, bouncing several times in the interim. This causes some instability in the 718 input of the 713 OR2 gate during the aforementioned transition phase. The DELAY-RISE circuit accommodates this by keeping the other OR2 input 722 asserted for a duration equal to the two CF period delay (4 milliseconds for a 2 MHz CLK, where CLK__FILT=CLK/4096).

The transfer function of the MIN-LOW circuit 714 is a non-inverting one that immediately passes an active-to-inactive (high-to-low) transition. The inactive-to-active (low-to-high) transition, on the other hand, is delayed to ensure that a minimum inactive (low) time is provided for the output H. In the design, an inactive pulse can be no less than a four C clock period. The motivation for this is to ensure that there is adequate time to latch the INBAD signals using the FD14SE* 437.

The sensitive output S 724 is generated from the AND2B1 723 whose inputs are the filtered U and 722 signals. An active S requires both U to be active and 722 to be inactive.

Let us consider the Type-A input signal we are describing is derived from an intrusion sensor that monitors a particular zone of a robotic workcell. Now, in order for the overall circuit to be reliable, it is important to monitor the sensor and periodically test it. This is to make sure that the sensor and the entire circuitry devoted to that sensor work, so that an intrusion does in fact deactivate the Type-A input signal properly (to make sure the sensor or signal isn't stuck active). However, this is a tricky proposition, since deactivation of the Type-A input that is being used ordinarily kills the emergency-stop circuit.

In order to facilitate online testing (keeping the circuit energized), a Type-T input section is used and associated with a Type-A input (or another type of input). The Type-T input filters the outputted health signal of the associated Type-A input that will soon cycle (deactivate, reactivate). It temporarily replaces the Type-A health signal with an active health signal, and then it waits for the Type-A health signal to cycle. However, it should not wait indefinitely (i.e. the emergency-stop circuit should not permanently ignore the associated signal being tested), as this would indirectly provide a means to carry out the selection (programming) of which signals are to be monitored by the circuit.

Once a Type-T input goes active, the emergency-stop circuit begins to ignore the associated Type-A input and starts a dedicated timer. Proper, nominal operation sees the Type-A input cycle (deactivate and reactivate) before the dedicated timer elapses. In such a case, the sensor channel passed the test. Shortly after the Type-A input cycles, it is again monitored, and the Type-T input simply feeds the outputted health signal of the Type-A, straight through. Once the Type-T input deactivates, the test cycle is complete.

On the other hand, if the Type-A signal doesn't cycle and the timer elapses, the emergency-stop circuit kills power and displays an associated error code identifying the faulty or stuck sensor. In such a case, the sensor channel failed the test. In this unusual case, the Type-A signal must cycle in order to reset the emergency-stop circuit, or alternatively, the input can be reprogrammed to be ignored altogether.

In practice, the associated intrusion sensor should be conventionally tripped during the testing period, for example by dropping a flap into the intrusion sensor's field of view. This tests all aspects of the sensor channel, from the functionality of the sensor right down to the health signal embedded within the emergency-stop circuit. The safety circuit remains safe while testing, because (it is assumed that) a second active sensor exists to monitor the same zone thereby providing redundancy. No single fault can cause an unsafe condition.

A further option to ensure that testing occurs frequently enough is to attach or embed a watchdog function within the Type-T input circuit to monitor the test signal, thereby making sure it activates (toggles) frequently enough.

Figure 6:
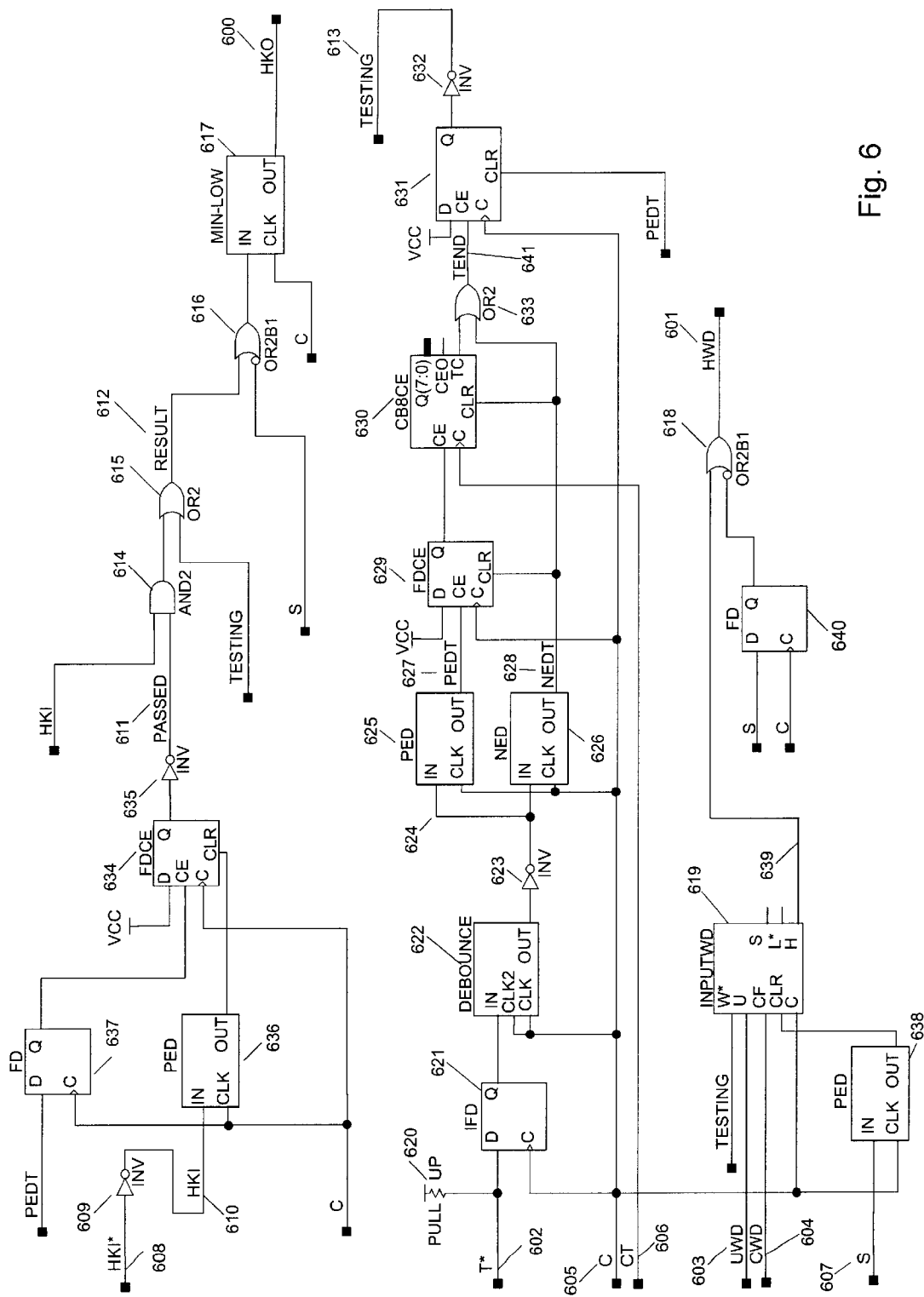
FIG. 6 illustrates the INPUTT FPGA subsection schematic of the preferred embodiment.

FIG. 6 shows a specific example of the Type-T input circuit, being the INPUTT subsection of FIG. 4. Outputs are two health signals HKO 600 representative of the health of the associated kill input and HWD 601 representative of sufficiently frequent testing. The inputs are test T* 602, use watchdog UWD 603, watchdog counter clock CWD 604, main clock C 605, and test clock CT 606. Remaining inputs are the sensitive input S 607 and the active low input health signal HKI* 608 of the associated kill input, which is inverted locally 609 to create a local active high input health signal HKI 610.

Pertinent internal signals are PASSED 611, RESULT 612, and TESTING 613. The TESTING signal is active during a period of testing. The PASSED signal stores the latent result of the previous test, and the RESULT signal is the health signal of the kill input being tested (i.e. PASSED and HKI via AND2 gate 614), which accommodates the testing period using OR2 gate 615. The RESULT signal doesn't consider whether the kill input is sensitive, but this is accomplished by the OR2B1 gate 616, the output of which is RESULT OR'd with the logical not of S. The output of the OR2B1 gate passes through the MIN-LOW filter 617 to create the HKO signal. Therefore HKO is forced active whenever S is inactive.

The HWD signal is generated by the output of the other OR2B1 gate 618, whose inputs are the output 639 of the embedded INPUTWD subsection 619 and the S signal delayed by one clock 640, to guard against a glitch in the inactive-to-active transition of S. Likewise then, HWD is forced active whenever S is inactive. Therefore, the remainder of this section is dedicated to the case where S is active, so that the testing function and watchdog function may be described.

The T* signal is an input to the FPGA, and it is active low but filtered in a manner similar to other input pad signals (620–623, inverting filtering elements). The output of the filter section is the 624 signal that is active high during the requested testing period. This signal passes through a positive-edge detection circuit PED 625, which generates a one clock cycle pulse PEDT 627 in response to the rising edge of 624, signifying the start of the testing period. This signal also passes through a negative-edge detection circuit NED 626, which generates a one clock cycle pulse NEDT 628 in response to the falling edge of 624, signifying the end of the requested testing period.

By setting and resetting flip-flop 629, PEDT and NEDT enable and disable the dedicated timer (counter 630). NEDT further resets the timer. The TESTING signal 613 is active high during the period of testing. It goes high in response to PEDT clearing flip-flop 631, where the output is inverted 632. It goes low (inactive) via 631–632 in response to TEND 641, which is either 633 the NEDT pulse or the terminal count TC pulse of the counter 630, whichever pulse comes first. Therefore, the actual testing period can be shorter than the requested testing period, specifically whenever the counter 630 elapses first.

The PASSED signal is generated by the setting and resetting of flip-flop 634 and subsequent inversion 635. (Note that the PASSED signal begins in the active state after power is applied.) The PASSED signal is deactivated (low) each time the testing period commences, which is done with a one clock delay 637 of the PEDT signal. (The delay is added here to guard against glitches in the output of the OR2 gate 615.) The PASSED signal is activated (high) whenever a positive-edge is detected 636 on the HKI signal, signifying an inactive-to-active transition of the associated sensor that is indicative of proper cycling.

So, when the testing period ends (TESTING goes low), it is up to the PASSED signal (and HKI) to keep RESULT high and subsequently the emergency-stop circuit energized. As noted the PASSED signal is lowered shortly after the beginning of testing, and it only goes high in response to the transition of the tested kill input from inactive to active. Then, the cycling needs to take place before the end of the testing period to keep the emergency-stop circuit energized. Failed tests do require HKI* (and hence IN1* in FIG. 4) to cycle sometime later in order to clear the test fault.

It remains to describe the watchdog section of FIG. 6. Embedded within the INPUTT subsection is an INPUTWD subsection 619, whose inputs are TESTING, the UWD signal describing whether the INPUTWD subsection should be used, and the CWD signal which is used for the counter clock within the INPUTWD subsection. Also, a pulse is used as the CLR input to 619, that denotes the positive-edge 638 of signal S. This ensures that the elapsed counter is refreshed as soon as the associated kill input becomes sensitive. 1001841 Note that the INPUTWD effectively places a minimum interval requirement between inactive-to-active transitions on T*, which equates to an interval requirement between starts of successive testing periods. Here it is assumed that the testing period itself is less than the watchdog period herein, where the testing period begins with the rising edge and ends with the falling edge of TESTING. So, the testing period will not cause a fault by this path, and moreover, the INPUTWD 619 is refreshed at the end of the testing period via the falling edge of TESTING. Only the converse period beginning with the falling edge of TESTING to its rising edge will cause the output 639 to go inactive, whenever that period exceeds 256/CWD if UWD is asserted. The rising edge of TESTING is controlled by the inactive-to-active transition of T* as described above.

Note that at power-up, as in all other figures, all flip-flops start in the reset state; care should be exercised to ensure the circuit handles that special case. For example, at power-up, the signal TESTING 613 is high (erroneously) because the output of 631 powers up low. Ordinarily though, the input T* will be inactive (high) at power up (or sometime after). That coupled with two other things quickly sets the output of 631 and thereby clears the TESTING signal for subsequent good use. Those two things are the following: (i) the fact that the signal 624 starts active because the output of DEBOUNCE 622 powers up low and (ii) a few clocks later the high T* propagates through deactivating 624 thereby creating a NEDT pulse 628, which sets the output of 631 via OR2 633. This all happens during the POWER_UP period. One skilled in the art will see that additional logic may be added in this place or other places to enhance the conditions at power up for more assurance that at the end of the POWER_UP period the logic is in the proper state for any case, or that in a way typical of digital design, additional logic may be added in a place to eliminate any possibility of an erroneous glitch somewhere of short duration which might result from gate propagation delays. Further, one skilled in the art will see that such additional logic is well within the scope and intent of the present invention.

Connector Pin-outs and Error Codes for Preferred Design

Tables 7–13 comprise the pin-outs for the connectors of the preferred design, and Table 14 lists the error codes for the preferred design.

TABLE 7

Pin-out of Connector P1 (Main Power).

| Pin # | Description | Notes |
|---|---|---|
| 1 | VCC (logic power) | 5 VDC logic power for emergency-stop circuit logic. |
| 2 | GND (logic ground) | |

TABLE 8

Pin-out of Connector P2 (Kill Inputs, Motors On, and Computer Interface).

| Pin # | Description | Notes |
|---|---|---|
| 1 | Input #0 (+) | Test input for Input #1, 4–25 VDC isolated inputs |
| 2 | Input #0 (−) | Test input for Input #1, 4–25 VDC isolated inputs |
| 3 | Input #1 (+) | 4–25 VDC isolated inputs |
| 4 | Input #1 (−) | " |
| 5 | Input #2 (+) | " |
| 6 | Input #2 (−) | " |
| 7 | Input #3 (+) | " |
| 8 | Input #3 (−) | " |
| 9 | Input #4 (+) | " |
| 10 | Input #4 (−) | " |
| 11 | Input #5 (+) | " |
| 12 | Input #5 (−) | " |
| 13 | Input #6 (+) | " |
| 14 | Input #6 (−) | " |
| 15 | Input #7 (+) | " |
| 16 | Input #7 (−) | " |
| 17 | Secondary DC Supply (+15 VDC) | Use depends on 3 PDT switch position |

TABLE 8-continued

Pin-out of Connector P2 (Kill Inputs, Motors On, and Computer Interface).

| Pin # | Description | Notes |
|---|---|---|
| 18 | Secondary DC COM | " |
| 19 | Secondary DC Supply (−15 VDC) | " |
| 20 | Computer VCC (CVCC) | Reference power supply from computer (input, typ. 5 VDC) |
| 21 | Computer Error Code Bit 0 | Error status bits |
| 22 | Computer Error Code Bit 1 | " |
| 23 | Computer Error Code Bit 2 | " |
| 24 | Computer Error Code Bit 3 | " |
| 25 | Computer Go (CGO*) | Primary Output of e-stop circuit |
| 26 | Computer Waiting-for-Motors-On (CWAIT*) | Primary Output of e-stop circuit |
| 27 | Computer GND (CGND) | Reference ground from computer (input) |
| 28 | Computer Ready (CRDY*) | Input that must be recycled (inactive-then-back-active) when emergency-stop circuit is killed so that computer acknowledges the killed circuit. |
| 29 | Computer Watchdog (CWD*) | Strobing input signal from computer whenever the computer is properly executing software. |
| 30 | Computer Enable (CE*) | Input from computer that is an extra kill signal or a signal that is to be fed through to enable/inhibit secondary outputs. |
| 31 | E-Stop, external (+) | 4–25 VDC isolated e-stop input |
| 32 | E-Stop, external (−) | " |
| 33 | Motors-On, external (+) | 4–25 VDC isolated motors-on input |
| 34 | Motors-On, external (−) | " |

TABLE 9

Pin-out of Connector P3 (Drivers).

| Pin # | Description | Notes |
|---|---|---|
| 1 | Enable #0 (+) | Secondary Output (isolated, normally open) |
| 2 | Enable #0 (−) | Secondary Output (isolated, normally open) |
| 3 | Enable #1 (+) | Secondary Output (isolated, normally open) |
| 4 | Enable #1 (−) | Secondary Output (isolated, normally open) |
| 5 | Enable #2 (+) | Secondary Output (isolated, normally open) |
| 6 | Enable #2 (−) | Secondary Output (isolated, normally open) |
| 7 | Enable #3 (+) | Secondary Output (isolated, normally open) |
| 8 | Enable #3 (−) | Secondary Output (isolated, normally open) |
| 9 | Inhibit #4 (+) | Secondary Output (isolated, normally closed) |
| 10 | Inhibit #4 (−) | Secondary Output (isolated, normally closed) |
| 11 | Inhibit #5 (+) | Secondary Output (isolated, normally closed) |
| 12 | Inhibit #5 (−) | Secondary Output (isolated, normally closed) |
| 13 | Inhibit #6 (+) | Secondary Output (isolated, normally closed) |
| 14 | Inhibit #6 (−) | Secondary Output (isolated, normally closed) |

TABLE 9-continued

Pin-out of Connector P3 (Drivers).

| Pin # | Description | Notes |
|---|---|---|
| 15 | Inhibit #7 (+) | Secondary Output (isolated, normally closed) |
| 16 | Inhibit #7 (−) | Secondary Output (isolated, normally closed) |
| 17 | Speaker, external (+) | Primary Output status (non-isolated) |
| 18 | Speaker, external (−) | Primary Output status (non-isolated) |
| 19 | Motors-On Lamp (+) | Primary Output status (isolated) |
| 20 | Motors-On Lamp (−) | " |
| 21 | Waiting-for-Motors-On Lamp (+) | " |
| 22 | Waiting-for-Motors-On Lamp (−) | " |
| 23 | Reserved | Reserved |
| 24 | Reserved | " |
| 25 | Reserved | " |
| 26 | Reserved | " |

TABLE 10

Pin-out of Connector P4 (Local Functions).

| Pin # | Description | Notes |
|---|---|---|
| 1 | Motors-On, internal (MOI*) | Non-isolated motors-on input |
| 2 | E-Stop, internal (ESTOPI*) | Non-isolated e-stop input |
| 3 | GND (logic ground) | Reference for above signals |
| 4 | WAITL+ | Waiting-for-Motors-On Lamp (+) |
| 5 | GOL+ | Motors-On Lamp (+) |
| 6 | WAITL− | Waiting-for-Motors-On Lamp (−) |
| 7 | GOL− | Motors-On Lamp (−) |
| 8 | Secondary DC Supply (+15 VDC) | Use depends on 3 PDT switch position |
| 9 | Secondary DC COM | Use depends on 3 PDT switch position |
| 10 | Secondary DC Supply (−15 VDC) | Use depends on 3 PDT switch position |

TABLE 11

Pin-out of Connector P5 (AC Line Sense).

| Pin # | Description | Notes |
|---|---|---|
| 1 | AC Input (+) | Isolated input from contacts of AC Motor Power Relay |
| 2 | NC | No connection |
| 3 | AC Input (−) | Isolated input from contacts of AC Motor Power Relay |

TABLE 12

Pin-out of Connector P6 (AC Motor Power Relay Coil Driver).

| Pin # | Description | Notes |
|---|---|---|
| 1 | RELAY+ | AC Motor Power Relay Coil Driver (+) |
| 2 | NC | No connection |
| 3 | NC | No connection |
| 4 | RELAY− | AC Motor Power Relay Coil Driver (−) |

TABLE 13

Pin-out of Connector P7 (Optional Xilinx Configuration Port).

| Pin # | Description | Notes |
|---|---|---|
| 1 | Logic Power | VCC |
| 2 | Logic Power Ground | GND |
| 3 | Xilinx Configuration Clock | CCLK |
| 4 | Xilinx Configuration Data | DIN |
| 5 | Xilinx Initialization Signal | INIT* |
| 6 | Xilinx Done Signal | DONE |
| 7 | Xilinx Program Signal | PROG* |

TABLE 14

Error Codes for the Preferred Design Example

| Error Code | Description | Display Priority |
|---|---|---|
| 0 | No Error (circuit waiting or hot) | N/A |
| 1 | Input #0 fault | $2^{nd}$ Priority |
| 2 | Input #1 fault | $3^{rd}$ |
| 3 | Input #2 fault | $4^{th}$ |
| 4 | Input #3 fault | $5^{th}$ |
| 5 | Input #4 fault | $6^{th}$ |
| 6 | Input #5 fault | $7^{th}$ |
| 7 | Input #6 fault | $8^{th}$ |
| 8 | Input #7 fault | $9^{th}$ |
| 9 | Computer Enable fault | $10^{th}$ |
| 10 | Computer Ready fault | $11^{th}$ |
| 11 | Secondary Power Supply fault | $12^{th}$ |
| 12 | Computer Watchdog fault | $13^{th}$ |
| 13 | AC Input fault | $14^{th}$ |
| 14 | ESTOP Button fault | Lowest, $15^{th}$ |
| 15 | Logic Power Supply fault (power-up/reset) | Highest, $1^{st}$ |

It should be understood that the examples and embodiments described herein are for illustrative purposes only and that various modifications or changes in light thereof will be suggested to persons skilled in the art and are to be included within the spirit and purview of this application and the scope of the appended claims. Specifically, while an embodiment of the invention is described herein as being implemented using an Field programmable Gate Array FPGA), it should be understood that the invention could alternatively be implemented using other programmable devices, such as an Application Specific Integrated Circuit (ASIC), a micro-controller, microprocessor, personal computer, or some combination of the above.

What is claimed is:

1. An electronic control system for controlling the flow of bulk power to a plurality of loads through at least one switch having a first and second position to start and stop the flow of bulk power, respectively, comprising:
    a) an emergency-stop circuit for receiving a plurality of input signals from a plurality of input sources and for providing a primary output signal to control said switch, wherein said first and second position of said switch are responsive to said emergency-stop circuit being energized or de-energized, respectively;
    b) at least one internal kill-type (KILL) signal, said KILL signal having an active and inactive state;
    c) a corresponding plurality of kill-type input (B) signals, each said B signal being selected from said plurality of input signals, and each said B signal having an active and inactive state responsive to an associated first input source being in a safe or healthy condition or not, respectively;
    d) a means to de-energize and keep de-energized said emergency-stop circuit whenever said KILL signal is active;

e) at least one testing-type input (T) signal, each said T signal being selected from said plurality of input signals, each said T signal having an active and inactive state responsive to a notification from an associated second input source that a test is occurring or not occurring, respectively, wherein each said T signal is selectively associated with at least one said B signal, wherein each said T signal maintains a dedicated testing channel with each said associated B signal;

f) a means to generate said KILL signal by activating said KILL signal whenever at least one said B signal is inactive and de-activating said KILL signal whenever all said B signals become active;

g) a substitute means for each said testing channel, in effect only during an associated testing period that begins when said T signal enters an active state signifying a test, to temporarily substitute an active signal for said associated B signal in said means to generate said KILL signal so that said associated B signal does not activate said KILL signal during said testing period, wherein said testing period ends at the first occurrence of either said associated B signal transitioning from inactive to active signifying a successful test, or said T signal returning to an inactive state; and h) a failed-test means for each said testing channel, in effect during an associated failed-test period beginning at the end of said associated testing period, to temporarily substitute for an unsuccessful test an inactive signal for said associated B signal in said means to generate said KILL signal so that said KILL signal is activated, wherein said unsuccessful test is characterized by failure of said associated B signal to transition from inactive to active during said testing period, having remained active throughout said testing period thereby signifying a stuck said B signal, and wherein said failed-test period ends whenever said stuck said B signal does transition from inactive-to-active signifying a belated successful test.

2. The electronic control system of claim 1, wherein said testing period ends concurrently with the elapse of a selectively specified interval of time signifying a timeout failure, wherein said interval of time elapses before said associated B signal transitions from inactive to active and before said T signal returns to an inactive state, wherein said interval of time begins when said testing period starts, and wherein said timeout failure signifies an unsuccessful test.

3. The electronic control system of claim 1, further comprising means to generate audio, visual, or electronic status to communicate to an operator or to a computer which B signal activated said KILL signal and whether said B signal failed a test.

4. The electronic control system of claim 1, wherein at least one of said B signals is a watchdog-type kill input (WD) signal, having an active and inactive state, wherein said WD signal is active only when its rate of toggling exceeds a selectively specified value and is otherwise inactive, wherein at least one said WD signal is associated with at least one of said T signals, wherein each said T signal and each associated WD signal form one said testing channel, and wherein a successful test is characterized by no toggling of said WD signal for a selectively specified interval during said testing period.

5. The electronic control system of claim 1, wherein at least one of said T signals is simultaneously and optionally utilized as a test watchdog-type kill input (TWD) signal, having an active and inactive state, wherein said TWD signal is active only when its rate of toggling exceeds a selectively specified value, and wherein said means to generate said KILL signal uses said TWD signal in the same manner as one of said B signals whenever said TWD is selectively utilized, thereby placing a requirement on how often tests are run.

6. The electronic control system of claim 1, further comprising a means for determining when a first energizing cycle has not yet occurred since application of power to logic of said emergency-stop circuit, said means for determining when a first energizing cycle has not yet occurred initializing said substitute means into an inactive state, and said failed-test means into an inactive state.

7. The electronic control system of claim 1, further comprising:

a) means to dynamically add and remove at least one additional T signal to an original at least one said T signal, wherein each said additional T signal is selected from said plurality of input signals, each said additional T signal having an active and inactive state responsive to a notification from an associated third input source that a test is occurring or not occurring, respectively, wherein each said additional T signal is associated with at least one said B signal, wherein each said additional T signal and each said associated B signal create an additional testing channel, wherein said means to dynamically add and remove dynamically adds when or after said emergency-stop circuit energizes and dynamically removes when said emergency-stop circuit de-energizes;

b) wherein said substitute means utilizes said additional testing channel like an original said testing channel during the period said additional testing channel is added; and c) wherein said failed-test means utilizes said additional testing channel like an original said testing channel during the period said additional testing channel is added.

8. The electronic control system of claim 7, wherein an original at least one said T signal is absent.

9. The electronic control system of claim 1, wherein said means to generate said KILL signal also utilizes, in the same manner as one of said B signals, at least one internal health-type (OK) signal representing internal circuit health of at least a section of said emergency-stop circuit, wherein said OK signal is active or inactive responsive to the existence of no errors or errors, respectively.

10. The electronic control system of claim 9, wherein one of said T signals is associated with said OK signal forming said testing channel, wherein said electronic control system further comprises a shut down means to temporarily shut down said section of said emergency-stop circuit in response to the beginning of a testing period, wherein said shut down means, when effective, inactivates and re-activates said OK signal during said testing period, and, when ineffective, does not cycle said OK signal to signify an unsuccessful test, wherein said failed-test means is activated when said shut down means is ineffective and said OK signal is stuck active.

11. The electronic control system of claim 1, further comprising:

a) at least one kill-type input (A) signal, said A signal being selected from said plurality of input signals, and said A signal having an active and inactive state responsive to an associated third input source being in a safe or healthy condition or not, respectively; and b) a first means to dynamically add and remove said A signal, dynamically adding said A signal upon or after energizing said emergency-stop circuit and dynamically removing said A signal upon or after de-energizing, wherein said means to generate said KILL signal also utilizes said A signal during the period it is added in the same manner as one of said B signals.

12. The electronic control system of claim 11, further comprising:

a) a second means to dynamically add and remove at least one additional T signal to an original at least one said T signal, wherein each said additional T signal is selected from said plurality of input signals, each said additional T signal having an active and inactive state responsive to a notification from an associated fourth input source that a test is occurring or not occurring, respectively, wherein each said additional T signal is associated with at least one said A signal, wherein each said additional T signal and each said associated A signal create an additional testing channel, wherein said second means to dynamically add and remove adds, upon or after the time said associated A signal is dynamically added, and dynamically removes when said emergency-stop circuit de-energizes;

b) wherein said substitute means utilizes said additional testing channel like an original said testing channel during the period said additional testing channel is added; and c) wherein said failed-test means utilizes said additional testing channel in the same manner as an original said testing channel during the period said additional testing channel is added.

13. The electronic control system of claim 12, wherein an original at least one said additional T signal is absent.

14. The electronic control system of claim 12, wherein said associated A signal is added upon its transition from inactive to active and said additional T signal is added thereafter.

15. The electronic control system of claim 14, wherein said associated A signal is connected to a dedicated input source for sensing the presence of bulk power whenever said emergency-stop circuit is energized, wherein said electronic control system further comprises a bypass means to temporarily redirect the flow of bulk power, maintaining the flow of bulk power, around said dedicated input source in response to the beginning of a testing period, wherein said bypass means, when effective, inactivates and re-activates said associated A signal and, when ineffective, does not cycle said associated A signal to signify an unsuccessful test, wherein said failed-test means is activated when said bypass means is ineffective and said associated A signal is stuck active.

16. An electronic control system for controlling the flow of bulk power to a plurality of loads through at least one switch having a first and second position to start and stop the flow of bulk power, respectively, comprising:

a) an emergency-stop circuit for receiving a plurality of input signals from a plurality of input sources and for providing a primary output signal to control said switch, wherein said first and second position of said switch are responsive to said emergency-stop circuit being energized or de-energized, respectively;

b) at least one internal ready-type start (RS) signal, said RS signal having an active and inactive state;

c) a means to activate said RS signal in response to a final cycle or a surplus cycle of a selectively programmable first number of deactivation and reactivation cycles of a corresponding ready-type input (RI) signal that is selected from said plurality of input signals, said RI signal having an active and inactive state;

d) a means to deactivate said RS signal in response to the deactivating of said corresponding RI signal or whenever said emergency-stop circuit is energized, wherein said means to deactivate said RS signal also resets the accumulated count of said deactivation and reactivation cycles whenever said emergency-stop circuit is energized;

e) a corresponding testing-type input (T) signal, said T signal being selected from said plurality of input signals, said T signal having an active and inactive state responsive to a notification from an associated input source that a test is occurring or not occurring, respectively, wherein said RI signal is associated with said T signal, thereby creating a testing channel;

f) a means to optionally utilize said RS signal to inhibit said emergency-stop circuit from energizing whenever said RS signal is inactive;

g) a means to optionally utilize said RI signal to de-energize said emergency-stop circuit in response to the deactivating of said RI signal;

h) a substitute means for said testing channel, in effect only during an associated testing period that begins when said T signal enters an active state signifying a test, to temporarily substitute an active signal for said RI signal in said means to deactivate said RS signal so that said RI signal does not deactivate said RS signal during said testing period and for said RI signal in said means to optionally utilize said RI signal to de-energize said emergency-stop circuit, wherein said testing period ends at the first occurrence of either said RI signal transitioning from inactive to active signifying a successful test or said T signal returning to an inactive state; and i) a failed-test means for said testing channel, in effect during a failed-test period beginning at the end of said associated testing period, to temporarily substitute for an unsuccessful test an inactive signal for said RI signal in said means to deactivate said RS signal and in said means to optionally utilize said RI signal to de-energize said emergency-stop circuit, where said unsuccessful test is characterized by failure of said RI signal to transition from inactive to active during said testing period, having remained active throughout said testing period thereby signifying a stuck RI signal, and wherein said failed-test period ends whenever said stuck RI signal does transition from inactive-to-active signifying a belated successful test.

17. The electronic control system of claim 16, further comprising a means for determining when a first energizing cycle has not yet occurred since application of power to logic of said emergency-stop circuit, said means for determining when a first energizing cycle has not yet occurred initializing said RS signal in the inactive state, initializing said substitute means and said failed-test means in the inactive state, resetting for the first energizing cycle, an accumulated count of said deactivation and reactivation cycles, and altering, for the first energizing cycle, a requirement of said first number of deactivation and reactivation cycles of said RI signal to a selectively programmable second number, said second number being greater than said first.

18. The electronic control system of claim 16, wherein said testing period ends at the elapse of a selectively specified interval of time signifying a timeout failure, wherein said interval of time elapses before said associated RI signal transitions from inactive to active and before said T signal returns to an inactive state, wherein said interval of time begins when said testing period starts, and wherein said timeout failure signifies an unsuccessful test.

19. An electronic control system for controlling the flow of bulk power to a plurality of loads through at least one switch having a first and second position to start and stop the flow of bulk power, respectively, comprising:

a) an emergency-stop circuit for receiving a plurality of input signals from a plurality of input sources and for providing a primary output signal to control said switch, wherein said first and second position of said switch are responsive to said emergency-stop circuit being energized or de-energized, respectively;

b) a means for determining whether or not a first energizing cycle has occurred since application of power to logic of said emergency-stop circuit;

c) a means to drive a dedicated error code whenever said first energizing cycle has not yet occurred, said dedicated error code superseding any other error code generated from any of said plurality of input sources;

d) a first number of clear-type input (CLEAR) signals selected from said plurality of input signals, each said CLEAR signal having an active and inactive state;

e) a means to clear said dedicated error code whenever said CLEAR signal becomes active prior to said first energizing cycle to reveal said superseded error code, and wherein said means to clear said dedicated error code also refreshes said superseded error code whenever said CLEAR signal thereafter becomes active;

f) a second number of internal ready-type start (RS) signals, each said RS signal having an active and inactive state, wherein said means for determining whether or not a first energizing cycle has occurred also initializes said RS signal in the inactive state;

g) a means to activate said RS signal in response to a final cycle or a surplus cycle of a third selected number of deactivation and reactivation cycles of a corresponding ready-type input (RI) signal that is selected from said plurality of input signals, said RI signal having an active and inactive state responsive to an associated first input source being ready to energize or not ready, respectively, wherein said means for determining whether or not a first energizing cycle has occurred also alters the requirement of said third number of deactivation and reactivation cycles of said RI signal to a fourth selected number to be required for first energizing cycle, said fourth number being greater than said third, wherein said means for determining whether or not a first energizing cycle has occurred also resets the accumulated count of said deactivation and reactivation cycles for the first energizing cycle;

h) a means to deactivate said RS signal in response to the deactivating of said corresponding RI signal or when said emergency-stop circuit is energized, wherein said means to deactivate said RS signal also resets the accumulated count of said deactivation and reactivation cycles whenever said emergency stop circuit is energized;

i) at least one motors-on-type input (MO) signal selected from said plurality of input signals, said MO signal having an active and inactive state;

j) at least one internal start-type (START) signal, said START signal having an active and inactive state, wherein said means for determining whether or not a first energizing cycle has occurred also initializes said START signal in an inactive state;

k) at least one internal kill-type (KILL) signal, said KILL signal having an active and inactive state, and a corresponding fifth number of kill-type input (B) signals, each said B signal being selected from said plurality of input signals, and each said B signal having an active and inactive state responsive to an associated second input source being in a safe or healthy condition or not, respectively;

l) a means to generate said KILL signal by activating said KILL signal whenever at least one said B signal is inactive and de-activating said KILL signal whenever all said B signals become active;

m) a means to generate a delay for at least a first selected interval of time, wherein said means to generate a delay is activated immediately following de-energizing of said emergency-stop circuit therefore creating a dying period for said emergency-stop circuit, and wherein said means for determining whether or not a first energizing cycle has occurred also activates said means to generate a delay for the first energizing cycle therefore creating a power-up-delay period for said emergency-stop circuit;

n) a means to activate said START signal when said power-up-delay period has passed prior to first energizing cycle or alternatively whenever said emergency-stop circuit has de-energized and said dying period has passed, when said KILL signal is inactive, and when optionally utilized said RS signal is not used or is used and active;

o) a means to deactivate said START signal when said emergency-stop circuit is energized, when said KILL signal is active, or whenever optionally utilized said RS signal is used and inactive;

p) a means to inhibit said emergency-stop circuit from energizing when said START signal is inactive;

q) a means to display a first status indicator in visual form, audio form, or in the form of an electrical output signal whenever said START signal is active, to signify said emergency-stop circuit is waiting to energize and to display a second status indicator in visual form, audio form, or in the form of an electrical output signal, when said emergency-stop circuit is energized, wherein said first status indicator remains further displayed whenever said second is displayed;

r) a means to energize said emergency-stop circuit when START signal is active and said MO signal is active and remains active for at least a second selected interval of time;

s) a means to de-energize and keep de-energized said emergency-stop circuit whenever said KILL signal is active or whenever optionally utilized said RI signal is used and inactive;

t) a sixth number of kill-type input (A) signals, each said A signal being selected from said plurality of input signals, and each said A signal having an active and inactive state responsive to an associated third input source being in a safe or healthy condition or not, respectively;

u) a means for dynamically adding and removing, comprising dynamically adding said A signal upon or after energizing said emergency-stop circuit and dynamically removing it upon or after de-energizing, wherein said means to generate said KILL signal also utilizes said A signal during the period it is added in the same manner as a B signal;

v) a seventh number of monitor-contact-type input (MC) signals, each said MC signal being selected from said plurality of input signals, each said MC signal having an active and inactive state, and wherein each said MC signal is active only when the circuit is de-energized and a monitored downstream relay controlled by said primary output signal of said emergency stop circuit has fully disengaged;

w) a means to optionally utilize said MC signal to inhibit said emergency-stop circuit from energizing by inhibiting said MO signal from becoming active whenever said MC signal is inactive;

x) at least one secondary output channel providing a secondary output (SO) signal, being connected to at least one external device, wherein said external device is enabled or inhibited responsive to said SO signal being active or inactive, respectively;

y) an eighth number of enable-type input (CE) signals, each said CE signal being selected from said plurality of input signals, each said CE signal being selectively associated with at least one said SO signal, wherein each CE signal and one said associated SO signal form a secondary output channel, and wherein each said CE signal having an active and inactive state responsive to an associated fourth input source desiring said external device to be enabled or inhibited, respectively;

z) a ninth number of watchdog-type input (WD) signals, each said WD signal being selected from said plurality of input signals, and each said WD signal having an active and inactive state responsive to a corresponding fifth input source signifying that said first input source or fourth input source may be operating properly or is not operating properly, respectively, said WD signal toggling at a rate faster than a first selected rate being the condition for said WD signal to be active;

aa) a means to generate said SO signal for each said secondary output channel by:
(1) driving said SO signal inactive continuously whenever corresponding said secondary output channel is selectively programmed to be continuously inhibited;
(2) driving said SO signal inactive whenever said emergency-stop circuit is de-energized and corresponding said secondary output channel is alternatively selectively programmed to be inhibited whenever said emergency-stop circuit is de-energized;
(3) driving said SO signal inactive whenever said CE signal is inactive and corresponding said secondary output channel is alternatively selectively programmed to be inhibited whenever said CE signal is inactive;
(4) driving said SO signal inactive whenever said secondary output channel is selectively programmed to be inhibited whenever said CE signal is inactive, said secondary output channel is further selectively programmed to be inhibited whenever said WD signal is inactive, and either said CE signal is inactive or said WD signal is inactive;
(5) driving said SO signal inactive whenever said secondary output channel is selectively programmed to be inhibited whenever said CE signal is inactive, said secondary output channel is further selectively programmed to be inhibited whenever said emergency-stop circuit is de-energized and said dying period has passed, and either said CE signal is inactive or said emergency-stop circuit is de-energized and dying period has passed; and
(6) otherwise driving said SO signal active;

ab) wherein said means to generate said KILL signal optionally utilizes said WD signal as a B signal;

ac) wherein said means to generate said KILL signal optionally utilizes said CE signal as a B signal;

ad) a tenth number of testing-type (T) signals, each said T signal being selected from said plurality of input signals, each said T signal having an active and inactive state responsive to the notification from an associated sixth input source that a test is occurring or not occurring, respectively, wherein said test determines whether said first, second, third, fourth, or fifth input source and corresponding said input signals are working properly or not, wherein each said T signal is selectively associated with at least one other signal or a plurality of other signals, wherein each said other signal is either a said RI signal, a said B signal, a said A signal, a said CE signal, or a said WD signal, wherein each said T signal maintains a dedicated testing channel with each said associated other signal;

ae) a substitute means for each said testing channel, in effect only during an associated testing period that begins when said T signal enters an active state signifying a test, to temporarily substitute an active signal for said associated other signal, in said means to generate said KILL signal when said associated other signal is one of said B signals, one of said A signals during the period said A signal is dynamically added, one of said WD signals that is being utilized as one of said B signals, or one of said CE signals that is being utilized as one of said B signals, in said means to deactivate said RS signal and said means to de-energize said emergency-stop circuit in the case where said associated other signal is a utilized RI signal, and in said means to generate said SO signal in the case where said associated other signal is one of said CE signals or one of said WD signals, where said WD signal is responsive to a corresponding said fifth input source signifying said fourth input source may be operating properly or is not operating properly, wherein said testing period ends at the first occurrence of either said associated other signal transitioning from inactive to active signifying a successful test or said T signal returning to an inactive state, and wherein said means for determining whether or not a first energizing cycle has occurred initializes said substitute means in an inactive state;

af) a failed-test means for each said testing channel, in effect during an associated failed-test period beginning at the end of said associated testing period, to temporarily substitute for an unsuccessful test an inactive signal for said associated other signal in said means to generate said KILL signal so that said KILL signal is activated in the case where said associated other signal is one of said B signals, one of said A signals during the period said A signal is added, one of said WD signals that is being utilized as one of said B signals, or one of said CE signals that is being utilized as one of said B signals, in said means to deactivate said RS signal and said means to de-energize said emergency-stop circuit so that said RS signal is de-activated and said emergency-stop circuit is de-energized where said associated other signal is a utilized RI signal, and in said means to generate said SO signal so that said SO signal is inactive where said associated other signal is one of said CE signals or one of said WD signals, where said WD signal is responsive to a corresponding said fifth input source signifying said fourth input source may be operating properly or is not operating properly, wherein said unsuccessful test is characterized by failure of said associated other signal to transition from inactive to active during said testing period, having remained active throughout said testing period thereby signifying a stuck other signal, wherein said failed-test period ends whenever said stuck other signal does transition from inactive-to-active signifying a belated successful test, and wherein said means for determining whether or not a first energizing cycle has occurred initializes said failed-test means in an inactive state;

ag) wherein said testing period optionally ends at the elapse of a selectively specified third interval of time signifying a timeout failure, wherein said third interval of time elapses before said associated other signal transitions from inactive to active and before said T signal returns to an inactive state, wherein said third interval of time begins when said testing period starts, and wherein said timeout failure signifies an unsuccessful test;

ah) wherein each said T signal is simultaneously and optionally utilized as a test watchdog-type kill input (TWD) signal, having an active and inactive state, wherein said TWD signal is active only when its rate of toggling exceeds a second selectively specified rate, and wherein said means to generate said KILL signal utilizes as a B signal said TWD signal whenever said TWD is selectively utilized, thereby placing a requirement on how often tests are run;

ai) means to generate audio, visual, or electronic status in the form of an error code to communicate to an operator or to a computer which input source of said plurality of input sources is responsible for de-energizing said emergency-stop circuit or preventing said emergency-stop circuit from energizing, and whether an unsuccessful test occurred; and aj) wherein further remaining uncommitted input signals from said plurality of input signals are ignored.

20. The electronic control system of claim 19, further comprising:

a) a programming means to alter said first, second, fifth, sixth, seventh, eighth, ninth, and tenth numbers so that they are each greater than or equal to zero and redefine functionality of utilized and uncommitted said plurality of input signals so that each is either one of said CLEAR signals, one of said RI signals, one of said MO signals, one of said B signals, one of said A signals, one of said MC signals, one of said CE signals, one of said WD signals, one of said T signal, or an uncommitted signal that is ignored;

b) a programming means to alter said third and fourth numbers, said first, second, and third intervals of time, said first and second selected rates, and provide programming of said secondary output channel;

c) a programming means to re-establish or omit utilization of said RS signal for said means to activate said START signal and said means to deactivate said START signal, to re-establish or omit utilization of said RI signal for said means to de-energize said emergency-stop circuit, to re-establish or omit utilization of said MC signal for said means to optionally utilize said MC signal to inhibit said emergency-stop circuit, to re-establish or omit utilization of said WD signal for said means to generate said KILL signal, to re-establish or omit utilization of said CE signal for said means to generate said KILL signal, and to re-establish or omit utilization of said T signal as a TWD signal for said means to generate said KILL signal;

d) a programming means to re-establish or omit utilization of said timeout failure applied to said testing channel;

e) a programming means to establish the association of one said CE signal with at least one said SO signal; and f) a programming means to establish the association of one said T signal with at least one said B signal, one said A signal, one said RI signal, one said CE signal or one said WD signal.

21. A method for controlling the flow of bulk power to a plurality of loads through at least one switch having a first and second position to start and stop the flow of bulk power, respectively, comprising an emergency-stop circuit for receiving a plurality of input signals from a plurality of input sources and for providing a primary output signal to control said switch, wherein said first and second position of said switch are responsive to said emergency-stop circuit being energized or de-energized, respectively; comprising the steps of:

(1) being in a power-up state for a selected first interval of time following application of power to logic of emergency-stop circuit, wherein said emergency-stop circuit is inhibited from energizing;

(2) being in a killed state, wherein said emergency-stop circuit is inhibited from energizing, and providing status for such including which if any input signal caused said emergency-stop circuit to de-energize or is preventing said emergency-stop circuit from energizing;

(3) remaining in said killed state until all of the said input signals that are not being tested and that have been selected for use in said killed state are active, said emergency-stop circuit does not have any internal errors, any ready-type input signals that have been selected for use have each been deactivated and reactivated a selected number of times, said selected number for first energizing cycle being greater than that for successive energizing cycles, and any said input signal that has been selected for use in said killed state and that has been tested has passed its most recent test;

(4) being in a waiting state, wherein said emergency-stop circuit is ready to energize, and providing status for such; and (5) remaining in said waiting state until a valid motors-on signal has been recognized at which time said method goes to step (6), or until one of the said input signals that has been selected for use in said killed state is inactive while not being tested or has failed a test or said emergency-stop circuit finds an internal error at which time said method returns to step (2);

(6) going to an energized state, wherein said emergency-stop circuit becomes energized, and providing status for such;

(7) dynamically adding a selected first number of selected input signals from said plurality of input signals as each becomes active, so that each remaining active becomes a condition for said emergency-stop circuit to remain energized;

(8) dynamically adding a selected second number of selected input signals from said plurality of input signals as a selected second interval of time elapses since said emergency-stop circuit energized, so that being active at time of addition and remaining active becomes a condition for said emergency-stop circuit to remain energized; and (9) remaining in the energized state, wherein said emergency-stop circuit remains energized until said emergency-stop circuit finds an internal error, one of the said input signals that has been selected for use in said killed state is inactive while not being tested or has failed a test, or one of the dynamically added input signals is inactive while not being tested during the period it is added or has failed a test during the period it is added, wherein said dynamically added input signals are removed when said emergency-stop circuit de-energizes;

(10) being in a dying state for a selected third interval of time, wherein the emergency-stop circuit is de-energized and inhibited from re-energizing, and providing status for such after which time said method returns to step (2).

22. The method of claim 21, further comprising in steps (6), (7), and (8), the task of dynamically adding a third number from said first or second number of said selected input signals to be dedicated to sensing the presence of said bulk power, so that the failure of building power de-energizes said emergency-stop circuit in the same way as the inactivation of any other utilized input signal; and including in all steps the task of controlling at least one secondary output signal connected to at least one external device for the purpose of enabling and inhibiting said external device, wherein the said external device is enabled or inhibited based on programming, the current step, and current values of said plurality of input signals, wherein specifically in step (10) certain external devices so programmed remain enabled so that they may continue or react in a controlled fashion by utilizing residual power within said electronic control system as long as it remains.

* * * * *